US012627347B2

(12) United States Patent
Chen et al.

(10) Patent No.: US 12,627,347 B2
(45) Date of Patent: May 12, 2026

(54) METHOD AND DEVICE FOR WIRELESS COMMUNICATION

(71) Applicant: Apogee 5G Global, LLC, Plano, TX (US)

(72) Inventors: Yu Chen, Shanghai (CN); Xiaobo Zhang, Shanghai (CN)

(73) Assignee: Apogee 5G Global, LLC, Plano, TX (US)

( * ) Notice: Subject to any disclaimer, the term of this patent is extended or adjusted under 35 U.S.C. 154(b) by 152 days.

(21) Appl. No.: 18/212,151

(22) Filed: Jun. 20, 2023

(65) Prior Publication Data

US 2023/0421221 A1 Dec. 28, 2023

(30) Foreign Application Priority Data

Jun. 27, 2022 (CN) .......................... 202210733683.6

(51) Int. Cl.
H04B 7/06 (2006.01)

(52) U.S. Cl.
CPC .................................. H04B 7/0626 (2013.01)

(58) Field of Classification Search
None
See application file for complete search history.

(56) References Cited

U.S. PATENT DOCUMENTS

| | | | | |
|---|---|---|---|---|
| 12,231,975 B2 * | 2/2025 | Tseng | .................... | H04W 76/23 |
| 2020/0174543 A1 * | 6/2020 | Hong | .................... | H04W 76/28 |

| | | | | |
|---|---|---|---|---|
| 2020/0204291 A1 * | 6/2020 | Awoniyi-Oteri | ...... | H04L 5/0055 |
| 2022/0022223 A1 * | 1/2022 | Yang | .................... | H04B 7/0404 |
| 2023/0388891 A1 * | 11/2023 | Wu | ................. | H04W 36/00692 |
| 2024/0414644 A1 * | 12/2024 | Park | ........................ | H04L 5/0091 |
| 2025/0015861 A1 * | 1/2025 | Wang | .................... | H04W 24/10 |
| 2025/0184888 A1 * | 6/2025 | Zhou | ................. | H04W 52/0209 |
| 2025/0310754 A1 * | 10/2025 | Kim | ........................ | H04W 76/30 |
| 2025/0317928 A1 * | 10/2025 | Yang | ................. | H04W 72/1268 |

OTHER PUBLICATIONS

Third Generation Partnership Project, "Technical Specification Group Radio Access Network; NR; Physical channels and modulation (Release 17)," 3GPP TS 38.211 V17.2.0 (Jun. 2022).
Third Generation Partnership Project, "Technical Specification Group Radio Access Network; NR; Multiplexing and channel coding (Release 17)," 3GPP TS 38.212 V17.2.0 (Jun. 2022).

(Continued)

*Primary Examiner* — Phirin Sam
(74) *Attorney, Agent, or Firm* — Volpe Koenig

(57) ABSTRACT

The present application discloses a method and a device for wireless communications, comprising: receiving a first signaling, the first signaling being used for configuring the first node to provide overheating assistance information; and upon reception of the first signaling, transmitting first overheating assistance information as a response to any condition in a first condition set being satisfied; herein, the first condition set comprises an overheating condition being satisfied; the first overheating assistance information comprises assistance information used for CSI report configurations. By transmitting a first signaling and receiving first overheating assistance information, the present application prevents the device from getting overheated, thus ensuring the service quality.

17 Claims, 6 Drawing Sheets

(56) References Cited

OTHER PUBLICATIONS

Third Generation Partnership Project, "Technical Specification Group Radio Access Network; NR; Physical layer procedures for data (Release 17)," 3GPP TS 38.214 V17.2.0 (Jun. 2022).
Third Generation Partnership Project, "Technical Specification Group Radio Access Network; NR; Radio Resource Control (RRC) protocol specification (Release 17)," 3GPP TS 38.331 V17.0.0 (Mar. 2022).

* cited by examiner

First encoder

First function

Decoding layer group#j

1300

1400

METHOD AND DEVICE FOR WIRELESS COMMUNICATION

CROSS REFERENCE TO RELATED APPLICATIONS

This application claims the priority benefit of Chinese Patent Application No. 202210733683.6, filed on Jun. 27, 2022, the full disclosure of which is incorporated herein by reference.

BACKGROUND

Technical Field

The present application relates to transmission methods and devices in wireless communication systems, and in particular to a method and device for overheating protection, reference signal measurement and reporting, CSI report configurations and Artificial Intelligence (AI) in communications.

Related Art

Application scenarios of future wireless communication systems are becoming increasingly diversified, and different application scenarios have different performance demands on systems. In order to meet different performance requirements of various application scenarios, the 3rd Generation Partner Project (3GPP) Radio Access Network (RAN) #72 plenary decided to conduct the study of New Radio (NR), or what is called fifth Generation (5G). The work Item (WI) of NR was approved at the 3GPP RAN #75 plenary to standardize the NR.

In communications, both Long Term Evolution (LTE) and 5G NR involves correct reception of reliable information, optimized energy efficiency ratio (EER), determination of information validity, flexible resource allocation, elastic system structure, effective information processing on non-access stratum (NAS), and lower traffic interruption and call drop rate, and support to lower power consumption, which play an important role in the normal communication between a base station and a User Equipment (UE), rational scheduling of resources, and also in the balance of system payload, thus laying a solid foundation for increasing throughput, meeting a variety of traffic needs in communications, enhancing the spectrum utilization and improving service quality. Therefore, LTE and 5G are indispensable no matter in enhanced Mobile BroadBand (eMBB), Ultra Reliable Low Latency Communication (URLLC) or enhanced Machine Type Communication (eMTC). And a wide range of requests can be found in terms of Industrial Internet of Things (IIoT), Vehicular to X (V2X), and Device to Device (D2D), Unlicensed Spectrum communications, and monitoring on UE communication quality, network plan optimization, Non Terrestrial Network (NTN) and Terrestrial Network (TN), Dual connectivity system, or combined, radio resource management and multi-antenna codebook selection, as well as signaling design, neighbor management, traffic management and beamforming. Information is generally transmitted by broadcast and unicast, and both ways are beneficial to fulfilling the above requests and make up an integral part of the 5G system. The UE's connection with the network can be achieved directly or by relaying.

As the number and complexity of system scenarios increases, more and more requests have been made on reducing interruption rate and latency, strengthening reliability and system stability, increasing the traffic flexibility and power conservation, and in the meantime the compatibility between different versions of systems shall be taken into account for system designing.

SUMMARY

Many communication scenarios will face the issue of overheating of apparatus, so in order to prevent the terminal from getting damaged or breaking down, a timely handling shall be provided. In conventional techniques, it is generally the baseband chips that result in a terminal's internal overheating, which generally can be avoided by reducing the number of carriers or coding layers corresponding to a multi-antenna system. In conventional techniques, CSI reports and relevant measurements generally do not directly lead to overheating, but with a view to pursuing more accurate CSI reports, or CSI reports yielding smaller overhead, or CSI reports which are predicting, the project of CSI reports based on Artificial Intelligence (AI) or Machine Learning (ML) has been set up in NR Release (R) 18. The applicant finds through researches that AI requires massive computing, and various implementations of AI computing may lead to overheating of the processor, including CPU and GPU, or, it can be assumed that it is the software that results in overheating, since all these are different from traditional UE overheating, the methods routinely used for addressing overheating cannot directly solve the problem of overheating caused by AI missive computing.

To address the above problem, the present application provides a solution. It should be noted that although most of the embodiments provided in the present application are targeted at AI/ML, the present application is also applicable to traditional networks, for instance, overheating that arises from a large or great number of CSI reports can also be solved by means of the method proposed by the present application, which is advantageous over conventional practices in ensuring the throughput rate. Furthermore, it should be noted that if no conflict is incurred, embodiments in any node in the present application and the characteristics of the embodiments are also applicable to any other node, and vice versa. What's more, the embodiments in the present application and the characteristics in the embodiments can be arbitrarily combined if there is no conflict.

The interpretation of terminology in the present application can refer to the descriptions in TS37 series and TS38 series of the 3rd Generation Partner Project (3GPP) protocols, if necessary.

To address the problem presented above, the present application provides a solution. It should be noted that the method proposed by the present application is also applicable to other problems.

The present application provides a method in a first node for wireless communications, comprising:

receiving a first signaling, the first signaling being used for configuring the first node to provide overheating assistance information; and upon reception of the first signaling, transmitting first overheating assistance information as a response to any condition in a first condition set being satisfied;

herein, the first condition set comprises an overheating condition being satisfied; the first overheating assistance information comprises assistance information used for Channel State Information (CSI) report configurations.

In one embodiment, a problem to be solved in the present application includes: how to address the issue of overheating caused by CSI reports.

In one embodiment, an advantage of the above method includes: supporting massive CSI reports and corresponding measurements; supporting AI/ML-based CSI reports; supporting the UE's internal overheating caused by apparatus other than the baseband; enhancing the communication efficiency; avoiding interruptions of communication; and providing effective protection to the equipment; streamlining the system design; reducing the system complexity; and ensuring a good compatibility.

Specifically, according to one aspect of the present application, the assistance information used for CSI report configurations comprises a configuration preference for a maximum number of first-type CSI report configurations, and a measurement of downlink RS resources is used for generating first-type CSIs, where a first-type CSI is configured by a first-type CSI report configuration.

Specifically, according to one aspect of the present application, the assistance information used for CSI report configurations comprises a configuration preference for a maximum number of first-type indexes, where each first-type index is associated with at least one first-type CSI report configuration, and each first-type CSI report configuration is used for configuring one first-type CSI, first-type CSIs configured by first-type CSI report configurations associated with a same first-type index are associated with a same generator, and a measurement of downlink RS resources is used for generating the first-type CSIs.

Specifically, according to one aspect of the present application, receiving a second signaling, the second signaling indicating a downlink reference signal resource set;

herein, the phrase that the first overheating assistance information comprising assistance information used for CSI report configuration includes a meaning that the first overheating assistance information indicates a first downlink reference signal resource subset, and that a measurement of the downlink reference signal resource subset is used for generating first-type CSIs; the downlink reference signal resource set comprises at least one reference signal resource other than the downlink reference signal resource subset.

Specifically, according to one aspect of the present application, receiving a third signaling, the third signaling indicating a first measurement report configuration, where a time requirement for the first measurement report configuration is a first time length; the phrase that the first overheating assistance information comprising assistance information used for CSI report configuration includes a meaning that the first overheating assistance information indicates a second time length, the second time length being a time requirement preferred by the first measurement report configuration.

Specifically, according to one aspect of the present application, receiving a third signaling, the third signaling indicating a second measurement report configuration, the second measurement report configuration comprising an accuracy requirement for CSI reports; the phrase that the first overheating assistance information comprising assistance information used for CSI report configuration includes a meaning that the first overheating assistance information indicates a first parameter, the first parameter being one of a predicting accuracy, a predicting number, a predicting model, a spatial configuration of positioning or integrity of positioning.

Specifically, according to one aspect of the present application, transmitting second overheating assistance information as a response to no longer experiencing internal overheating; the second overheating assistance information comprising assistance information used for CSI report configuration.

Specifically, according to one aspect of the present application, transmitting a first message before the action of transmitting first overheating assistance information, the first message indicating a first capability parameter;

herein, the first overheating assistance information comprises a second capability parameter; the first capability parameter and the second capability parameter are respectively used for indicating computing capabilities.

Specifically, according to one aspect of the present application, the first node is a terminal of Internet of Things (IoT).

Specifically, according to one aspect of the present application, the first node is a relay.

Specifically, according to one aspect of the present application, the first node is a U2N remote UE.

Specifically, according to one aspect of the present application, the first node is a vehicle-mounted terminal.

Specifically, according to one aspect of the present application, the first node is an aircraft.

Specifically, according to one aspect of the present application, the first node is a cellphone.

Specifically, according to one aspect of the present application, the first node is a communication terminal supporting multi-SIM communications.

The present application provides a method in a second node for wireless communications, comprising:

transmitting a first signaling, the first signaling being used for configuring a receiver of the first signaling to provide overheating assistance information; and receiving first overheating assistance information after the transmission of the first signaling;

herein, any condition in a first condition set being satisfied is used for triggering a transmission of the first overheating assistance information, and the first condition set comprises an overheating condition being satisfied; the first overheating assistance information comprises assistance information used for Channel State Information (CSI) report configurations.

Specifically, according to one aspect of the present application, the assistance information used for CSI report configurations comprises a configuration preference for a maximum number of first-type CSI report configurations, and a measurement of downlink RS resources is used for generating first-type CSIs, where a first-type CSI is configured by a first-type CSI report configuration.

Specifically, according to one aspect of the present application, the assistance information used for CSI report configurations comprises a configuration preference for a maximum number of first-type indexes, where each first-type index is associated with at least one first-type CSI report configuration, and each first-type CSI report configuration is used for configuring one first-type CSI, first-type CSIs configured by first-type CSI report configurations associated with a same first-type index are associated with a same generator, and a measurement of downlink RS resources is used for generating the first-type CSIs.

Specifically, according to one aspect of the present application, transmitting a second signaling, the second signaling indicating a downlink reference signal resource set;

herein, the phrase that the first overheating assistance information comprising assistance information used for CSI report configuration includes a meaning that the first overheating assistance information indicates a first downlink reference signal resource subset, and that a measurement of the downlink reference signal resource subset is used for generating first-type CSIs; the downlink reference signal resource set comprises at least one reference signal resource other than the downlink reference signal resource subset.

Specifically, according to one aspect of the present application, transmitting a third signaling, the third signaling indicating a first measurement report configuration, where a time requirement for the first measurement report configuration is a first time length; the phrase that the first overheating assistance information comprising assistance information used for CSI report configuration includes a meaning that the first overheating assistance information indicates a second time length, the second time length being a time requirement preferred by the first measurement report configuration.

Specifically, according to one aspect of the present application, transmitting a third signaling, the third signaling indicating a second measurement report configuration, the second measurement report configuration comprising an accuracy requirement for CSI reports; the phrase that the first overheating assistance information comprising assistance information used for CSI report configuration includes a meaning that the first overheating assistance information indicates a first parameter, the first parameter being one of a predicting accuracy, a predicting number, a predicting model, a spatial configuration of positioning or integrity of positioning.

Specifically, according to one aspect of the present application, receiving second overheating assistance information; the second overheating assistance information comprising assistance information used for CSI report configuration, no longer experiencing internal overheating being used to trigger a transmission of the second overheating assistance information.

Specifically, according to one aspect of the present application, receiving a first message before the action of receiving first overheating assistance information, the first message indicating a first capability parameter;

herein, the first overheating assistance information comprises a second capability parameter; the first capability parameter and the second capability parameter are respectively used for indicating computing capabilities.

Specifically, according to one aspect of the present application, the second node is a satellite.

Specifically, according to one aspect of the present application, the second node is a relay.

Specifically, according to one aspect of the present application, the second node is a vehicle-mounted terminal.

Specifically, according to one aspect of the present application, the second node is an aircraft.

Specifically, according to one aspect of the present application, the second node is a base station.

Specifically, according to one aspect of the present application, the second node is a cell or cell group.

Specifically, according to one aspect of the present application, the second node is a gateway.

Specifically, according to one aspect of the present application, the second node is an access-point.

The present application provides a first node for wireless communications, comprising:

a first receiver, receiving a first signaling, the first signaling being used for configuring the first node to provide overheating assistance information; and a first transmitter, upon reception of the first signaling, transmitting first overheating assistance information as a response to any condition in a first condition set being satisfied;

herein, the first condition set comprises an overheating condition being satisfied; the first overheating assistance information comprises assistance information used for Channel State Information (CSI) report configurations.

The present application provides a second node for wireless communications, comprising:

a second transmitter, transmitting a first signaling, the first signaling being used for configuring a receiver of the first signaling to provide overheating assistance information; and a second receiver, receiving first overheating assistance information after the transmission of the first signaling;

herein, any condition in a first condition set being satisfied is used for triggering a transmission of the first overheating assistance information, and the first condition set comprises an overheating condition being satisfied; the first overheating assistance information comprises assistance information used for Channel State Information (CSI) report configurations.

In one embodiment, compared with the prior art, the present application is advantageous in the following aspects:

Its good flexibility enables it to support advantages brought about by AI and ML for CSI reports, and also to avoid overheating caused by massive computing.

Its good extensibility helps deal with other issues apart from overheating of baseband apparatus, such as overheating caused by software. It can easily be extended to or used to address the overheating caused by AI and ML applications in other aspects, including but not limited to CSI reports.

It is compatible with traditionally used solutions to overheating, which can be used independently or in combination.

It can describe the computing capability of the UE more accurately.

It can better protect the terminal from getting overheated.

It can provide better control granularity.

BRIEF DESCRIPTION OF THE DRAWINGS

Other features, objects and advantages of the present application will become more apparent from the detailed description of non-restrictive embodiments taken in conjunction with the following drawings.

DESCRIPTION OF THE EMBODIMENTS

The technical scheme of the present application is described below in further details in conjunction with the drawings. It should be noted that the embodiments of the present application and the characteristics of the embodiments may be arbitrarily combined if no conflict is caused.

Embodiment 1

Figure 1:
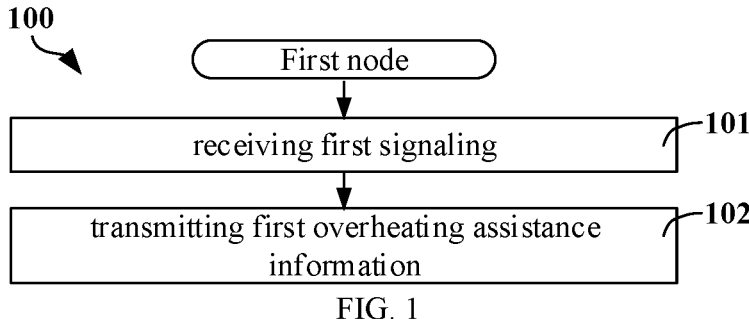
FIG. 1 illustrates a flowchart of receiving a first signaling and transmitting first overheating assistance information according to one embodiment of the present application.

Embodiment 1 illustrates a flowchart of receiving a first signaling and transmitting first overheating assistance information according to one embodiment of the present application, as shown in FIG. 1. In FIG. 1, each step represents a step, it should be particularly noted that the sequence order of each box herein does not imply a chronological order of steps marked respectively by these boxes.

In Embodiment 1, the first node in the present application receives a first signaling in step 101; and transmits first overheating assistance information in step 102.

Herein, the first signaling being used for configuring the first node to provide overheating assistance information; and the first overheating assistance information, upon reception of the first signaling, is transmitted as a response to any condition in a first condition set being satisfied, the first condition set comprising an overheating condition being satisfied; the first overheating assistance information comprises assistance information used for Channel State Information (CSI) report configurations.

In one embodiment, the first node is a User Equipment (UE).

In one embodiment, it is a field of an RRC IE that is used for configuring CSI reports.

In one embodiment, a name of the field of the RRC IE includes csi-ReportingBand.

In one embodiment, the field of the RRC IE is csi-ReportingBand.

In one embodiment, the overheating condition being satisfied is evaluated in a physical layer.

In one embodiment, the overheating condition being satisfied is evaluated in a higher layer.

In one embodiment, the first overheating assistance information is transmitted on a Physical Uplink Shared CHannel (PUSCH).

In one embodiment, the first overheating assistance information comprises a Radio Resource Control (RRC) Information Element (IE).

In one embodiment, the first overheating assistance information is an information element (IE) in an RRC message.

In one embodiment, the first overheating assistance information is or comprises an OverheatingAssistance IE.

In one embodiment, an RRC message carrying the first overheating assistance information is a UEAssistanceInformation message.

In one embodiment, the first overheating assistance information is transmitted on an uplink dedicated control channel (DCCH).

In one embodiment, the first signaling is an RRC signaling.

In one embodiment, the first signaling is a RRCReconfiguration message.

In one embodiment, the first signaling comprises at least partial fields in a RRCReconfiguration message.

In one embodiment, the first signaling is or comprises otherConfig in a RRCReconfiguration message.

In one embodiment, the first signaling is or comprises overheatingAssistanceConfig comprised by otherConfig in a RRCReconfiguration message.

In one embodiment, the sentence of the first signaling being used for configuring the first node to provide overheating assistance information includes a meaning that when an overheatingAssistanceConfig field of the first signaling is configured as setup, the first node assumes itself as being configured to provide overheating assistance information; when an overheatingAssistanceConfig field of the first signaling is not configured as setup, the first node assumes itself as not being configured to provide overheating assistance information.

In one embodiment, the sentence of the first signaling being used for configuring the first node to provide overheating assistance information includes a meaning that when an overheating condition of the first node is satisfied, the first node provides overheating assistance information to the network.

In one embodiment, the sentence of the first signaling being used for configuring the first node to provide overheating assistance information includes a meaning that when any condition in the first condition set is satisfied, the first node provides overheating assistance information to the network.

In one embodiment, the first condition set comprises that overheating assistance information currently is different from that indicated in a last transmission.

In one embodiment, the overheating condition comprises being undergoing internal overheating.

In one embodiment, the overheating condition comprises being undergoing overheating caused by software.

In one embodiment, the overheating condition comprises being undergoing overheating caused by AI.

In one embodiment, the overheating condition comprises being undergoing overheating of any apparatus other than a baseband apparatus.

In one embodiment, the overheating condition comprises being undergoing CPU overheating.

In one embodiment, the overheating condition comprises being undergoing TPU overheating.

In one embodiment, the overheating condition comprises being undergoing GPU overheating.

In one embodiment, the overheating condition comprises being undergoing IPU overheating.

In one embodiment, the sentence that the first overheating assistance information comprising assistance information used for CSI report configuration includes a meaning that the assistance information provided by the first overheating assistance information is used for assisting with configuring CSI reports.

In one embodiment, the sentence that the first overheating assistance information comprising assistance information used for CSI report configuration includes a meaning that the assistance information provided by the first overheating assistance information is used for assisting the network in configuring CSI reports of the first node.

In one embodiment, the CSI report configuration comprises generating configurations of CSI information.

In one embodiment, the CSI report configuration comprises transmitting parameters of CSI information.

In one embodiment, the CSI report configuration comprises configuring a periodicity of transmitting CSI reports.

In one embodiment, the CSI report configuration comprises configuring the precision of CSI reports.

In one embodiment, the CSI report configuration comprises configuring a relay requirement for transmitting CSI reports.

In one embodiment, the CSI report configuration comprises configuring RS resources or an RS resource group that CSI reports correspond to.

In one embodiment, the CSI report configuration comprises configuring frequency-domain resources or a bandwidth that CSI reports correspond to.

In one embodiment, the CSI report configuration comprises configuring a generator for CSI reports.

In one embodiment, the CSI report configuration comprises configuring a way of generating CSI reports as being AI/ML-based.

In one embodiment, the CSI report configuration comprises configuring the number of CSI reports.

In one embodiment, a first-type CSI corresponds to a frequency-domain resource.

In one embodiment, a first-type CSI corresponding to a frequency-domain resource includes that the first-type CSI indicates parameters of a channel on the frequency-domain resource.

In one embodiment, a first-type CSI corresponding to a frequency-domain resource includes that the first-type CSI is computed based on the hypothesis that a radio signal is transmitted on the frequency-domain resource.

In one embodiment, a first-type CSI corresponding to a frequency-domain resource includes that channel parameters on the frequency-domain resource are used for generating the first-type CSI.

In one embodiment, a first-type CSI corresponding to a frequency-domain resource includes that the first-type CSI is used for resuming a precoding matrix for each sub-band on the frequency-domain resource.

In one embodiment, the channel parameters include a raw channel matrix.

In one embodiment, the channel parameters include a channel Eigen vector.

In one embodiment, the channel parameters include a channel impulse response.

In one embodiment, the first-type CSI is used for determining a phase or an amplitude or a coefficient between at least two antenna ports.

In one embodiment, the first-type CSI is used for determining at least one Eigen vector of each sub-band in the first frequency band resource group.

In one embodiment, the first-type CSI is used for determining at least one Eigen value of each sub-band in the first frequency band resource group.

In one embodiment, the first-type CSI is used for determining a precoding matrix of each sub-band in the first frequency band resource group.

In one embodiment, a serving cell of the first node indicates a first Reference Signal (RS) resource group.

In one embodiment, a serving cell of the first node indicates the first RS resource group via the first signaling.

In one embodiment, a serving cell of the first node indicates the first RS resource group via a signaling other than the first signaling.

In one embodiment, a serving cell of the first node indicates the first RS resource group via the second signaling.

In one embodiment, a serving cell of the first node indicates the first RS resource group via the third signaling.

In one embodiment, measurements of downlink RS resources comprised in the first RS resource group are used for generating first-type CSIs.

In one embodiment, the first RS resource group comprises at least one downlink RS resource used for channel measurement.

In one subembodiment, the first RS resource group comprises at least one downlink RS resource used for interference measurement.

In one embodiment, measurements of the first RS resource group include channel measurement(s) performed in the at least one downlink RS resource used for channel measurement.

In one embodiment, measurements of the first RS resource group include interference measurement(s) performed in the at least one downlink RS resource used for interference measurement.

In one embodiment, any RS resource in the first RS resource group is a downlink RS resource.

In one embodiment, any RS resource in the first RS resource group is a first-type Channel Status Information Reference Signal (CSI-RS) resource.

In one embodiment, the first signaling is used to determine that frequency-domain resources to which the first-type CSIs correspond to are the first frequency band resource group.

In one embodiment, one of the second signaling or the third signaling is used to determine that frequency-domain resources to which the first-type CSIs correspond to are the first frequency band resource group.

In one embodiment, the first RS resource group is indicated by resourcesForChannelMeasurement, or csi-IM-ResourcesForInterference, or nzp-CSI-RS-ResourcesForInterference in the first signaling.

In one embodiment, the first RS resource group is indicated by resourcesForChannelMeasurement, or csi-IM-ResourcesForInterference, or nzp-CSI-RS-ResourcesForInterference in the second signaling.

In one embodiment, the first RS resource group is indicated by resourcesForChannelMeasurement, or csi-IM-ResourcesForInterference, or nzp-CSI-RS-ResourcesForInterference in the third signaling.

In one embodiment, the first-type CSI is for a first frequency band resource group.

In one embodiment, the first-type CSI is associated with a first frequency band resource group.

In one embodiment, the first frequency band resource group is indicated by a csi-ReportingBand in the first signaling.

In one embodiment, the first frequency band resource group is indicated by a csi-ReportingBand in the second signaling or the third signaling.

In one embodiment, any sub-band in the first frequency band resource group comprises at least one Physical Resource Block (PRB).

In one embodiment, the first frequency band resource group belongs to a first Bandwidth Part (BWP).

In one embodiment, other than sub-bands at the edge of the first BWP, a number of PRBs comprised in each of the other sub-bands in the first frequency band resource group is P1, where P1 is a positive integral multiple of 4.

In one embodiment, P1 is indicated by a higher-layer signaling.

In one embodiment, P1 is related to a number of PRBs comprised in the first BWP.

In one embodiment, if the first frequency band resource group comprises a first sub-band in the first BWP, a number of PRB(s) comprised in the first sub-band is P1−(Ns mod P1), where Ns is an index of a starting PRB in the first BWP; if the first frequency band resource group comprises a last sub-band in the first BWP, a number of PRB(s) comprised in the last sub-band is (Ns+Nw) mod P1 or P1, where Nw is a number of PRB(s) in the first BWP.

In one embodiment, P1 is one of 4, 8, 16 or 32.

In one embodiment, the first-type CSIs include multiple CSIs.

In one embodiment, the multiple CSIs are transmitted on a physical layer channel.

In one embodiment, the physical-layer channel is a Physical Uplink Shared Channel (PUSCH).

In one embodiment, the physical-layer channel is a Physical Uplink Control Channel (PUCCH).

In one embodiment, the multiple CSIs include a matrix indicator for precoding, and include one CQI for each sub-band in the first frequency band resource group.

In one embodiment, the matrix indicator for precoding is non-codebook.

In one embodiment, the first signaling is used for configuring performance of the first-type CSI.

In one embodiment, the first overheating assistance information is used for indicating a preference for the performance of the first-type CSI.

In one embodiment, the performance of the first-type CSI refers to accuracy of the first-type CSI.

In one embodiment, the performance of the first-type CSI refers to an error between a channel parameter indicated by the first-type CSI or a channel parameter resumed by the first-type CSI and an actual channel parameter.

For a channel matrix or Eigen vector, a common error can be described with a Normalized Mean Square Error (NMSE) or Cosine Similarity; as for CQI, the error can be calculated by counting a NACK rate.

In one embodiment, first-type CSIs configured by first-type CSI report configurations associated with a same first-type index are associated with a same generator.

In one embodiment, the generator is used for generating the first-type CSIs, and the measurement of the first RS resource group is used for obtaining an input to the generator.

In one embodiment, the generator is obtained based on training.

In one embodiment, the generator is a non-linear function.

In one embodiment, a first frequency-domain width is associated with radio channel properties, where a range of radio channels to which the generator of the first-type CSIs is applicable can be indicated by the first frequency-domain width.

In one embodiment, the first frequency-domain width is measured in Physical Resource Blocks (PRBs).

In one embodiment, the first frequency-domain width is measured in 4 PRBs.

In one embodiment, the first frequency-domain width is measured in 8 PRBs.

In one embodiment, the first frequency-domain width is measured in sub-bands.

In one embodiment, a subcarrier spacing corresponding to the PRB or the sub-band is fixed.

In one embodiment, a subcarrier spacing corresponding to the PRB or the sub-band changes with a frequency range to which the first frequency band resource group belongs.

In one embodiment, when a frequency range to which the first frequency band resource group belongs is a frequency Range 1, a subcarrier spacing corresponding to the PRB or the sub-band is a first subcarrier spacing (SCS); when a frequency range to which the first frequency band resource group belongs is a frequency Range 2, a subcarrier spacing corresponding to the PRB or the sub-band is a second subcarrier spacing (SCS); the first subcarrier spacing is smaller than the second subcarrier spacing.

In one embodiment, the first subcarrier spacing is 15 kHz, and the second subcarrier spacing is 60 kHz.

In one embodiment, a subcarrier spacing corresponding to the PRB or the sub-band is a subcarrier spacing of a first BWP, where the first frequency band resource group belongs to the first BWP.

In one embodiment, the first frequency-domain width is measured in MHz.

In one embodiment, the action of monitoring the performance of the generator is performed by the first node.

In one embodiment, the action of monitoring the performance of the generator is performed by the second node.

In one embodiment, the action of monitoring the performance of the generator comprises: using an output of the generator to resume channel parameters, thus determining the performance of the generator according to errors between the channel parameters being resumed and a reference channel parameter.

In one embodiment, the channel parameters include a channel matrix, or an Eigen vector, or a channel impulse response.

In one embodiment, the reference channel parameter is a raw channel matrix obtained by measuring RS resources, or an Eigen vector calculated according to a raw channel matrix or a raw channel impulse response.

In one embodiment, the assistance information used for CSI report configurations comprises a configuration preference for a maximum number of first-type CSI report configurations, and a measurement of downlink RS resources is used for generating first-type CSIs, where a first-type CSI is configured by a first-type CSI report configuration.

In one embodiment, the assistance information used for CSI report configurations comprises a configuration preference for a maximum number of first-type CSI report configurations.

In one subembodiment, the maximum number of first-type CSI report configurations is X, where X is a positive integer.

In one embodiment, the phrase that a measurement of downlink RS resources is used for generating first-type CSIs includes a meaning that a measurement of the first RS resource group is used for generating the first-type CSIs.

In one embodiment, the phrase that a measurement of downlink RS resources is used for generating first-type CSIs includes a meaning that measurement(s) of at least one downlink RS resource is(are) used for generating the first-type CSIs.

In one embodiment, the phrase that a measurement of downlink RS resources is used for generating first-type CSIs includes a meaning that a measurement of downlink RS resources associated with the first-type CSIs is used for generating the first-type CSIs.

In one embodiment, the first-type CSI is a result yielded by measuring at least one downlink RS resource and handling the measurement result.

In one embodiment, the first-type CSI is a result yielded by measuring a specific downlink RS resource and handling the measurement result.

In one embodiment, the first-type CSI is aperiodic.

In one embodiment, the first-type CSI is periodic, namely, the first-type CSI comprises a group of CSIs.

In one embodiment, the first-type CSI is periodic, namely, the first-type CSI comprises a group of CSIs generated in a similar or the same way after measuring RS resources at different times.

In one embodiment, a generator of the first-type CSIs is obtained based on training.

In one embodiment, the first-type CSIs are used for precoding.

In one embodiment, the first-type CSIs are non-codebook based.

In one embodiment, before the first overheating assistance information is transmitted, the first node transmits first capability information, the first capability information indicating a maximum number of first-type CSI report configurations being supported; the configuration preference for a maximum number of first-type CSI report configurations that is comprised by the assistance information used for CSI report configurations is less than the number of maximum first-type CSI report configurations being supported.

In one embodiment, a serving cell of the first node can also indicate second-type CSI report configurations, the second-type CSI report configurations being used for configuring second-type CSIs, where the second-type CSIs are codebook-based rather than being obtained by training.

In one subembodiment, the first overheating assistance information does not comprise a preference for a maximum number of the second-type CSI report configurations.

In one embodiment, the assistance information used for CSI report configurations comprises a configuration preference for a maximum number of first-type indexes, where each first-type index is associated with at least one first-type CSI report configuration, and each first-type CSI report configuration is used for configuring one first-type CSI, first-type CSIs configured by first-type CSI report configurations associated with a same first-type index are associated with a same generator, and a measurement of downlink RS resources is used for generating the first-type CSIs.

In one embodiment, the sentence that the assistance information used for CSI report configurations comprises a configuration preference for a maximum number of first-type indexes means that the assistance information used for CSI report configurations comprises a configuration preference for a maximum number of first-type indexes.

In one embodiment, the assistance information used for CSI report configurations comprises that a configuration preference for a maximum number of first-type indexes is to recommend a maximum number of first-type indexes.

In one embodiment, the assistance information used for CSI report configurations comprises that a configuration preference for a maximum number of first-type indexes is to recommend a maximum number of first-type indexes.

In one embodiment, there is a one-to-one mapping relationship between the first-type indexes and the first-type CSI report configurations.

In one embodiment, a first-type index is only mapped to one first-type CSI report configuration.

In one embodiment, a first-type CSI report configuration is only mapped to one first-type index.

In one embodiment, the first-type indexes are indexes of the first-type CSI report configurations.

In one embodiment, an index comprised by a first-type CSI report configuration is a first-type index.

In one embodiment, the first-type indexes are not indexes of the first-type CSI report configurations.

In one embodiment, there is a one-to-one mapping relationship between the first-type CSI report configurations and the first-type CSIs.

In one embodiment, each of the first-type CSI report configurations is only used for configuring one said first-type CSI.

In one embodiment, a first-type CSI is only configured by a first-type CSI report configuration.

In one embodiment, the first-type indexes are indexes of generators for first-type CSIs.

In one embodiment, each first-type CSI is associated with a generator.

In one embodiment, a generator of CSI is only associated with one first-type CSI.

In one embodiment, a generator of CSI is only associated with multiple first-type CSIs.

In one embodiment, a number of first-type indexes is identical to a number of generators of first-type CSIs.

In one embodiment, the generator is based on AI/ML.

In one embodiment, the generator is a model based on AI/ML.

In one embodiment, the generator shall be obtained by training.

In one embodiment, the generator is based on UE implementation.

In one embodiment, the generator is network-configured.

In one embodiment, an advantage of the above method is that restricting the number of (AI-based) generators or recommending fewer of them when faced with overheating will contribute to an effective reduction of amount of computing, thus reducing heating.

In one embodiment, an advantage of the above method is that: when there is overheating, one can reduce the number of CSI reports or CSI report configurations, or can choose not to reduce CSI reports but use fewer (types of) generators to help reduce heating, or can combine the methods mentioned above based on the degree of overheating, which can be indicated through overheating assistance information.

In one embodiment, the generator in the present application is or includes an encoder.

In one embodiment, the sentence that first-type CSIs configured by first-type CSI report configurations associated with a same first-type index are associated with a same generator means that: the same generator is or includes a same encoder.

In one embodiment, the same generator is or includes a same encoder.

In one embodiment, a generator for generating CSIs is or includes an encoder.

In one embodiment, a generator for generating first-type CSIs or first-type CSI reports is or includes an encoder.

Embodiment 2

Figure 2:
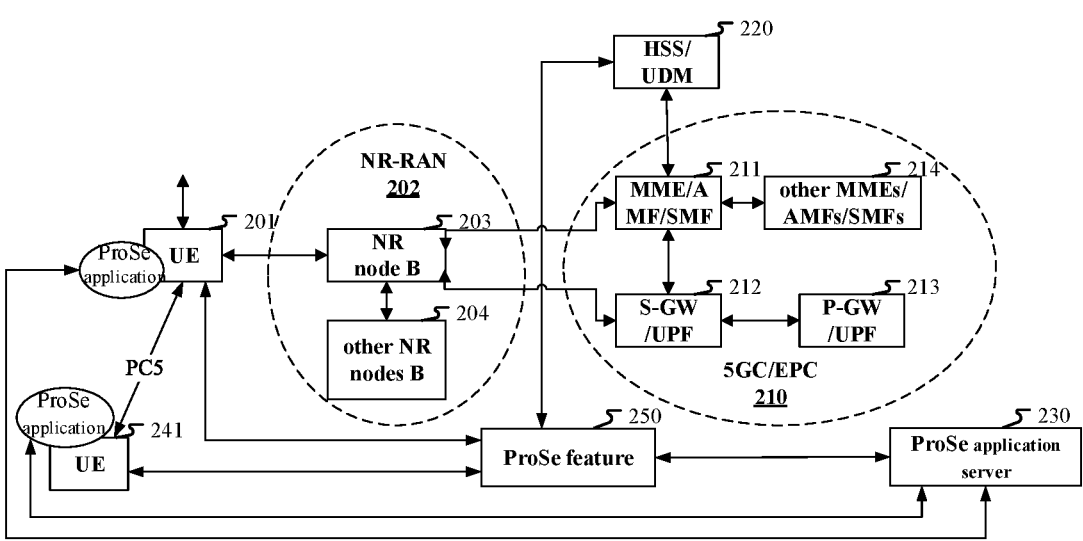
FIG. 2 illustrates a schematic diagram of a network architecture according to one embodiment of the present application.

Embodiment 2 illustrates a schematic diagram of a network architecture according to the present application, as shown in FIG. 2.

FIG. 2 is a diagram illustrating a network architecture 200 of 5G NR, Long-Term Evolution (LTE) and Long-Term Evolution Advanced (LTE-A) systems. The 5G NR or LTE network architecture 200 may be called 5G System/Evolved Packet System (5GS/EPS) 200 or other appropriate terms. The 5GS/EPS 200 may comprise one or more UEs 201, an NG-RAN 202, a 5G-Core Network/Evolved Packet Core (5GC/EPC) 210, a Home Subscriber Server/Unified Data Management (HSS/UDM) 220 and an Internet Service 230. The 5GS/EPS 200 may be interconnected with other access networks. For simple description, the entities/interfaces are not shown. As shown in FIG. 2, the 5GS/EPS 200 provides packet switching services. Those skilled in the art will find it easy to understand that various concepts presented throughout the present application can be extended to networks providing circuit switching services or other cellular networks. The NG-RAN 202 comprises an NR node B (gNB) 203 and other gNBs 204. The gNB 203 provides UE 201-oriented user plane and control plane terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the 5GC/EPC 210 for the UE 201. Examples of UE 201 include cellular phones, smart phones, Session Initiation Protocol (SIP) phones, laptop computers, Personal Digital Assistant (PDA), Satellite Radios, non-terrestrial base station communications, satellite mobile communications, Global Positioning Systems (GPSs), multimedia devices, video devices, digital audio players (for example, MP3 players), cameras, games consoles, unmanned aerial vehicles, air vehicles, narrowband physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected with the 5G-CN/EPC 210 via an S1/NG interface. The 5G-CN/EPC 210 comprises a Mobility Management Entity (MME)/Authentication Management Field (AMF)/Session Management Function (SMF) 211, other MMEs/AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212. The S-GW/UPF 212 is connected to the P-GW/UPF 213. The P-GW 213 provides UE IP address allocation and other functions. The P-GW/UPF 213 is connected to the Internet Service 230. The Internet Service 230 comprises IP services corresponding to operators, specifically including Internet, Intranet, IP Multimedia Subsystem (IMS) and Packet Switching Streaming (PSS) services.

In one embodiment, the first node in the present application is the UE 201.

In one embodiment, the second node in the present application is the gNB 203.

In one embodiment, a radio link from the UE 201 to the NR Node B is an uplink.

In one embodiment, a radio link from the NR Node B to the UE 201 is a downlink.

In one embodiment, the UE 201 supports relay transmission.

In one embodiment, the UE 201 includes cellphone.

In one embodiment, the UE 201 is a means of transportation including automobile.

In one embodiment, the UE 201 supports multiple SIMs.

In one embodiment, the gNB 203 is a base station.

In one embodiment, the gNB 203 is a flight platform.

In one embodiment, the gNB 203 is satellite equipment.

Embodiment 3

Figure 3:
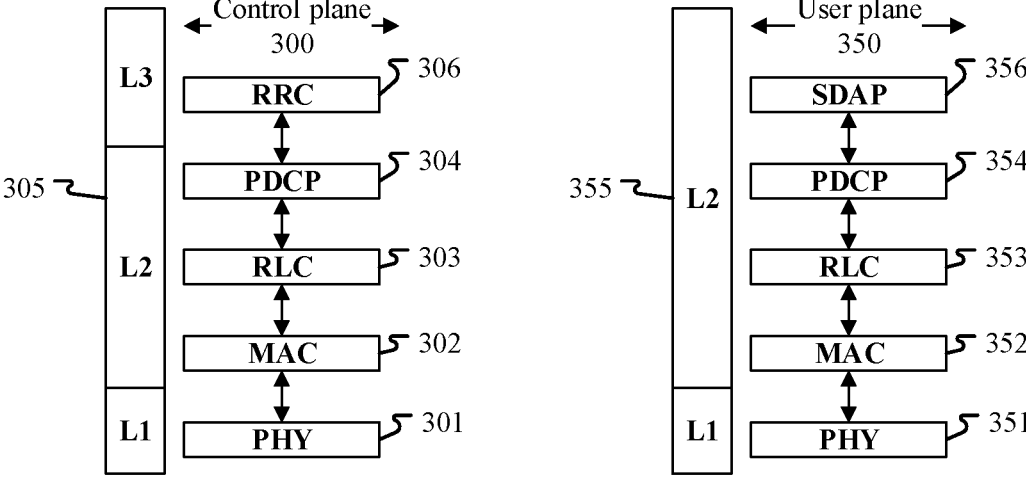
FIG. 3 illustrates a schematic diagram of a radio protocol architecture of a user plane and a control plane according to one embodiment of the present application.

Embodiment 3 illustrates a schematic diagram of a radio protocol architecture of a user plane and a control plane according to the present application, as shown in FIG. 3. FIG. 3 is a schematic diagram illustrating an embodiment of a radio protocol architecture of a user plane 350 and a control plane 300. In FIG. 3, the radio protocol architecture for a control plane 300 between a first node (UE, gNB or, satellite or aircraft in NTN) and a second node (gNB, UE, or satellite or aircraft in NTN), or between two UEs, is represented by three layers, which are a layer 1, a layer 2 and a layer 3, respectively. The layer 1 (L1) is the lowest layer which performs signal processing functions of various PHY layers. The L1 is called PHY 301 in the present application. The layer 2 (L2) 305 is above the PHY 301, and is in charge of the link between a first node and a second node as well as between two UEs via the PHY 301. The L2 305 comprises a Medium Access Control (MAC) sublayer 302, a Radio Link Control (RLC) sublayer 303 and a Packet Data Convergence Protocol (PDCP) sublayer 304. All these sublayers terminate at the second nodes. The PDCP sublayer 304 provides multiplexing among variable radio bearers and logical channels. The PDCP sublayer 304 provides security by encrypting packets and also support for inter-cell handover of the first node between nodes. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating between first nodes various radio resources (i.e., resource block) in a cell. The MAC sublayer 302 is also in charge of HARQ operation. In the control plane 300, The RRC sublayer 306 in the L3 layer is responsible for acquiring radio resources (i.e., radio bearer) and configuring the lower layer using an RRC signaling between the second node and the first node. The PC5 Signaling Protocol (PC5-S) sublayer 307 is responsible for processing the signaling protocol at the PC5 interface. The radio protocol architecture in the user plane 350 comprises the L1 layer and the L2 layer. In the user plane 350, the radio protocol architecture used for the first node and the second node in a PHY layer 351, a PDCP sublayer 354 of the L2 layer 355, an RLC sublayer 353 of the L2 layer 355 and a MAC sublayer 352 of the L2 layer 355 is almost the same as the radio protocol architecture used for corresponding layers and sublayers in the control plane 300, but the PDCP sublayer 354 also provides header compression used for higher-layer packet to reduce radio transmission overhead. The L2 layer 355 in the user plane 350 also comprises a Service Data Adaptation Protocol (SDAP) sublayer 356, which is in charge of the mapping between QoS streams and a Data Radio Bearer (DRB), so as to support diversified traffics. Although not described in FIG. 3, the first node may comprise several higher layers above the L2 355. Besides, the first node comprises a network layer (i.e., IP layer) terminated at a P-GW 213 of the network side and an application layer terminated at the other side of the connection (i.e., a peer UE, a server, etc.).

In one embodiment, the radio protocol architecture in FIG. 3 is applicable to the first node in the present application.

In one embodiment, the radio protocol architecture in FIG. 3 is applicable to the second node in the present application.

In one embodiment, the first overheating assistance information in the present application is generated by the RRC 306.

In one embodiment, the second overheating assistance information in the present application is generated by the RRC 306.

In one embodiment, the first signaling in the present application is generated by the RRC 306.

In one embodiment, the second signaling in the present application is generated by the RRC 306.

In one embodiment, the third signaling in the present application is generated by the RRC 306.

In one embodiment, the first message in the present application is generated by the RRC 306.

Embodiment 4

Figure 4:
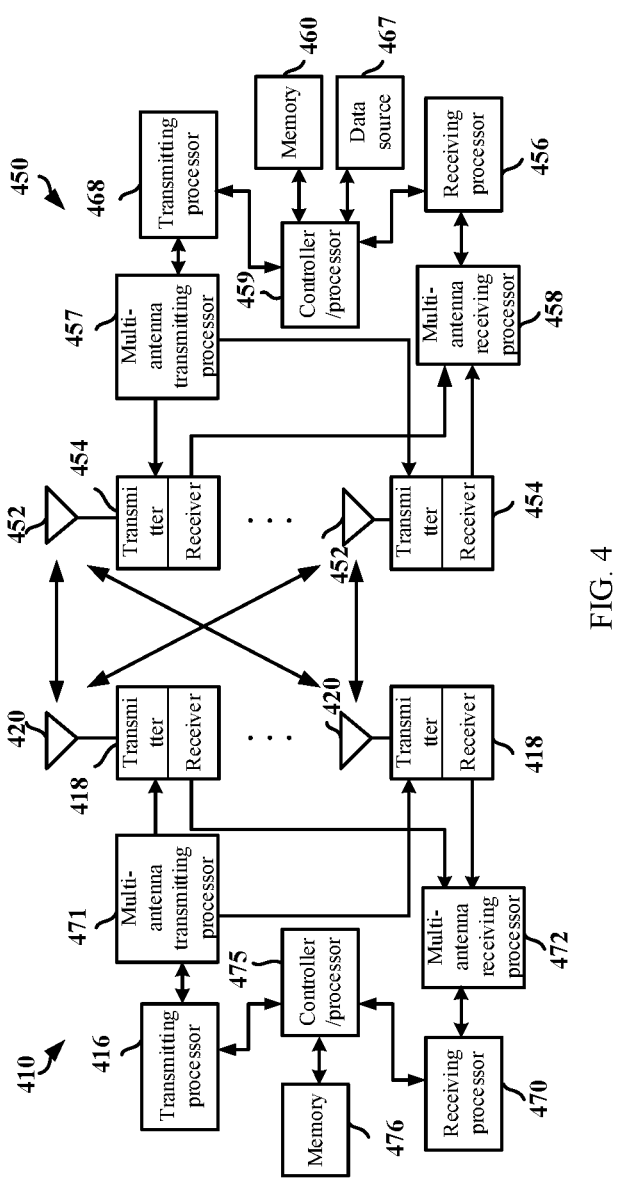
FIG. 4 illustrates a schematic diagram of a first communication device and a second communication device according to one embodiment of the present application.

Embodiment 4 illustrates a schematic diagram of a first communication device and a second communication device according to one embodiment of the present application, as shown in FIG. 4. FIG. 4 is a block diagram of a first communication device 450 and a second communication device 410 in communication with each other in an access network.

The first communication device 450 comprises a controller/processor 459, a memory 460, a data source 467, a transmitting processor 468, a receiving processor 456, and optionally a multi-antenna transmitting processor 457, a multi-antenna receiving processor 458, a transmitter/receiver 454 and an antenna 452.

The second communication device 410 comprises a controller/processor 475, a memory 476, a receiving processor 470, a transmitting processor 416, and optionally a multi-antenna receiving processor 472, a multi-antenna transmitting processor 471, a transmitter/receiver 418 and an antenna 420.

In a transmission from the second communication device 410 to the first communication device 450, at the second communication device 410, a higher layer packet from a core network is provided to the controller/processor 475. The controller/processor 475 provides functions of the L2 layer (Layer-2). In the transmission from the second communication device 410 to the first communication device

450, the controller/processor 475 provides header compression, encryption, packet segmentation and reordering, and multiplexing between a logical channel and a transport channel, and radio resource allocation of the first communication device 450 based on various priorities. The controller/processor 475 is also in charge of HARQ operation, a retransmission of a lost packet and a signaling to the first communication device 450. The transmitting processor 416 and the multi-antenna transmitting processor 471 perform various signal processing functions used for the L1 layer (i.e., PHY). The transmitting processor 416 performs coding and interleaving so as to ensure a Forward Error Correction (FEC) at the second communication device 410 side and the mapping to signal clusters corresponding to each modulation scheme (i.e., BPSK, QPSK, M-PSK, and M-QAM, etc.). The multi-antenna transmitting processor 471 performs digital spatial precoding, which includes precoding based on codebook and precoding based on non-codebook, and beamforming processing on encoded and modulated signals to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multicarrier symbol streams. Each transmitter 418 converts a baseband multicarrier symbol stream provided by the multi-antenna transmitting processor 471 into a radio frequency (RF) stream, which is later provided to different antennas 420.

In a transmission from the second communication device 410 to the first communication device 450, at the first communication device 450, each receiver 454 receives a signal via a corresponding antenna 452. Each receiver 454 recovers information modulated to the RF carrier, and converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs reception analog precoding/beamforming on a baseband multicarrier symbol stream provided by the receiver 454. The receiving processor 456 converts baseband multicarrier symbol streams which have gone through reception analog precoding/beamforming operations from time domain to frequency domain using FFT. In frequency domain, physical layer data signals and reference signals are de-multiplexed by the receiving processor 456, where the reference signals are used for channel estimation while data signals are processed in the multi-antenna receiving processor 458 by multi-antenna detection to recover any spatial stream targeting the first communication device 450. Symbols on each spatial stream are demodulated and recovered in the receiving processor 456 to generate a soft decision. Then the receiving processor 456 decodes and de-interleaves the soft decision to recover the higher-layer data and control signal transmitted by the second communication device 410 on the physical channel. Next, the higher-layer data and control signal are provided to the controller/processor 459. The controller/processor 459 provides functions of the L2 layer. The controller/processor 459 can be associated with a memory 460 that stores program code and data. The memory 460 can be called a computer readable medium. In the transmission from the second communication device 410 to the second communication device 450, the controller/processor 459 provides demultiplexing between a transport channel and a logical channel, packet reassembling, decrypting, header decompression and control signal processing so as to recover a higher-layer packet from the core network. The higher-layer packet is later provided to all protocol layers above the L2 layer. Or various control signals can be provided to the L3 for processing.

In a transmission from the first communication device 450 to the second communication device 410, at the first communication device 450, the data source 467 is configured to provide a higher-layer packet to the controller/processor 459. The data source 467 represents all protocol layers above the L2 layer. Similar to a transmitting function of the second communication device 410 described in the transmission from the second communication node 410 to the first communication node 450, the controller/processor 459 performs header compression, encryption, packet segmentation and reordering, and multiplexing between a logical channel and a transport channel based on radio resource allocation so as to provide the L2 layer functions used for the user plane and the control plane. The controller/processor 459 is also responsible for a retransmission of a lost packet, and a signaling to the second communication device 410. The transmitting processor 468 performs modulation and mapping, as well as channel coding, and the multi-antenna transmitting processor 457 performs digital multi-antenna spatial precoding, including precoding based on codebook and precoding based on non-codebook, and beamforming. The transmitting processor 468 then modulates generated spatial streams into multicarrier/single-carrier symbol streams. The modulated symbol streams, after being subjected to analog precoding/beamforming in the multi-antenna transmitting processor 457, are provided from the transmitter 454 to each antenna 452. Each transmitter 454 first converts a baseband symbol stream provided by the multi-antenna transmitting processor 457 into a radio frequency symbol stream, and then provides the radio frequency symbol stream to the antenna 452.

In a transmission from the first communication device 450 to the second communication device 410, the function of the second communication device 410 is similar to the receiving function of the first communication device 450 described in the transmission from the second communication device 410 to the first communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and the multi-antenna receiving processor 472 jointly provide functions of the L1 layer. The controller/processor 475 provides functions of the L2 layer. The controller/processor 475 can be associated with the memory 476 that stores program code and data. The memory 476 can be called a computer readable medium. In the transmission from the first communication device 450 to the second communication device 410, the controller/processor 475 provides de-multiplexing between a transport channel and a logical channel, packet reassembling, decrypting, header decompression, control signal processing so as to recover a higher-layer packet from the first communication device (UE) 450. The higher-layer packet coming from the controller/processor 475 may be provided to the core network.

In one embodiment, the first communication device 450 comprises at least one processor and at least one memory, the at least one memory comprises computer program codes; the at least one memory and the computer program codes are configured to be used in collaboration with the at least one processor. The second communication device 450 at least: receives a first signaling, the first signaling being used for configuring the first node to provide overheating assistance information; upon reception of the first signaling, transmitting first overheating assistance information as a response to any condition in a first condition set being satisfied; herein, the first condition set comprises an overheating condition being satisfied; the first overheating assistance information comprises assistance information used for Channel State Information (CSI) report configurations.

In one embodiment, the first communication node 450 comprises a memory that stores a computer readable instruction program, the computer readable instruction program generates actions when executed by at least one processor, which include: receiving a first signaling, the first signaling being used for configuring the first node to provide overheating assistance information; and upon reception of the first signaling, transmitting first overheating assistance information as a response to any condition in a first condition set being satisfied; herein, the first condition set comprises an overheating condition being satisfied; the first overheating assistance information comprises assistance information used for Channel State Information (CSI) report configurations.

In one embodiment, the second communication device 410 comprises at least one processor and at least one memory, the at least one memory comprises computer program codes; the at least one memory and the computer program codes are configured to be used in collaboration with the at least one processor. The second communication device 410 at least: transmits a first signaling, the first signaling being used for configuring a receiver of the first signaling to provide overheating assistance information; and receives first overheating assistance information after the transmission of the first signaling; herein, any condition in a first condition set being satisfied is used for triggering a transmission of the first overheating assistance information, and the first condition set comprises an overheating condition being satisfied; the first overheating assistance information comprises assistance information used for Channel State Information (CSI) report configurations.

In one embodiment, the second communication device 410 comprises a memory that stores a computer readable instruction program, the computer readable instruction program generates actions when executed by at least one processor, which include: transmitting a first signaling, the first signaling being used for configuring a receiver of the first signaling to provide overheating assistance information; and receiving first overheating assistance information after the transmission of the first signaling; herein, any condition in a first condition set being satisfied is used for triggering a transmission of the first overheating assistance information, and the first condition set comprises an overheating condition being satisfied; the first overheating assistance information comprises assistance information used for Channel State Information (CSI) report configurations.

In one embodiment, the first communication device 450 corresponds to the first node in the present application.

In one embodiment, the first communication device 450 is a UE.

In one embodiment, the first communication device 450 is a vehicle-mounted terminal.

In one embodiment, the second communication device 410 is a relay.

In one embodiment, the second communication device 410 is a satellite.

In one embodiment, the second communication device 410 is an aircraft.

In one embodiment, the second communication device 410 is a base station.

In one embodiment, the second communication device 410 is a relay.

In one embodiment, the second communication device 410 is a satellite.

In one embodiment, the second communication device 410 is an aircraft.

In one embodiment, the receiver 454 (comprising the antenna 452), the receiving processor 456 and the controller/processor 459 are used for receiving the first signaling in the present application.

In one embodiment, the receiver 454 (comprising the antenna 452), the receiving processor 456 and the controller/processor 459 are used for receiving the second signaling in the present application.

In one embodiment, the receiver 454 (comprising the antenna 452), the receiving processor 456 and the controller/processor 459 are used for receiving the third signaling in the present application.

In one embodiment, the transmitter 454 (comprising the antenna 452), the transmitting processor 468 and the controller/processor 459 are used for transmitting the first message in the present application.

In one embodiment, the transmitter 454 (comprising the antenna 452), the transmitting processor 468 and the controller/processor 459 are used for transmitting the first overheating assistance information in the present application.

In one embodiment, the transmitter 454 (comprising the antenna 452), the transmitting processor 468 and the controller/processor 459 are used for transmitting the second overheating assistance information in the present application.

In one embodiment, the transmitter 418 (comprising the antenna 420), the transmitting processor 416 and the controller/processor 475 are used for transmitting the first signaling in the present application.

In one embodiment, the transmitter 418 (comprising the antenna 420), the transmitting processor 416 and the controller/processor 475 are used for transmitting the second signaling in the present application.

In one embodiment, the transmitter 418 (comprising the antenna 420), the transmitting processor 416 and the controller/processor 475 are used for transmitting the third signaling in the present application.

In one embodiment, the receiver 418 (comprising the antenna 420), the receiving processor 470 and the controller/processor 475 are used for receiving the first message in the present application.

In one embodiment, the receiver 418 (comprising the antenna 420), the receiving processor 470 and the controller/processor 475 are used for receiving the first overheating assistance information in the present application.

In one embodiment, the receiver 418 (comprising the antenna 420), the receiving processor 470 and the controller/processor 475 are used for receiving the second overheating assistance information in the present application.

Embodiment 5

Figure 5:
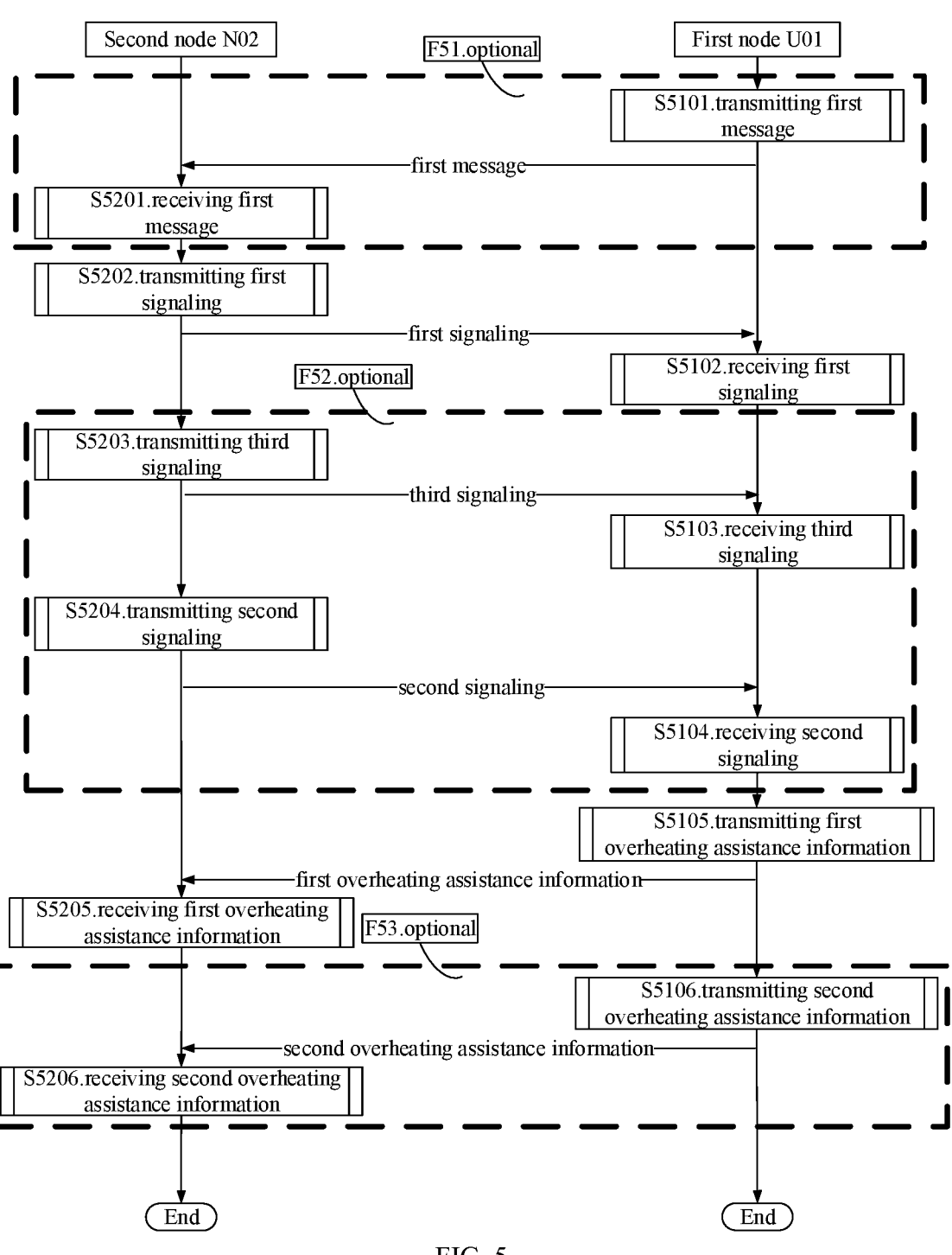
FIG. 5 illustrates a flowchart of radio signal transmission according to one embodiment of the present application.

Embodiment 5 illustrates a flowchart of radio signal transmission according to one embodiment of the present application, as shown in FIG. 5. In FIG. 5, U01 corresponds to the first node in the present application, and N02 corresponds to the second node in the present application. It should be particularly noted that the sequence illustrated herein does not set any limit on the orders in which signals are transmitted and implementations in this present application. Herein, steps in F51, F52 and F53 are optional.

The first node U01 transmits a first message in step S5101; and receives a first signaling in step S5102; receives a third signaling in step S5103; and receives a second signaling in step S5104; transmits first overheating assistance information in step S5105; and transmits second overheating assistance information in step S5106.

The second node N02 receives a first message in step S5201; and transmits a first signaling in step S5202; transmits a third signaling in step S5203; transmits a second signaling in step S5204; receives first overheating assistance information in step S5205; and receives second overheating assistance information in step S5206.

In Embodiment 5, the first signaling being used for configuring the first node to provide overheating assistance information; the first node U01, upon reception of the first signaling, transmits first overheating assistance information as a response to any condition in a first condition set being satisfied; herein, the first condition set comprises an overheating condition being satisfied; the first overheating assistance information comprises assistance information used for Channel State Information (CSI) report configurations.

In one embodiment, the first node U01 is a UE.

In one embodiment, the first node U01 is a Remote U2N UE.

In one embodiment, the first node U01 is a relay.

In one embodiment, the second node N02 belongs to the first network.

In one embodiment, the second node N02 is a network.

In one embodiment, the second node N02 is a base station.

In one embodiment, the second node N02 is a relay.

In one embodiment, the second node N02 is a satellite.

In one embodiment, the second node N02 is an NTN.

In one embodiment, the second node N02 is a TN.

In one embodiment, the second node N02 is a serving cell of the first network of the first node U01.

In one embodiment, the second node N02 is a cell group of the first network of the first node U01.

In one embodiment, the second node N02 is a PCell of the first network of the first node U01.

In one embodiment, the second node N02 is an MCG of the first network of the first node U01.

In one embodiment, the second node N02 is a SpCell of the first network of the first node U01.

In one embodiment, there is an RRC connection between the first node U01 and the second node N02.

In one embodiment, the first node U01 is in an RRC connected state.

In one embodiment, before the step S5105, the first node U01 transmits first capability information, the first capability information indicating a number of maximum first-type CSI report configurations being supported.

In one embodiment, before the step S5105, the first node U01 transmits first capability information, the first capability information indicating a maximum number of first-type CSI report configurations being supported.

In one embodiment, the configuration preference for a maximum number of first-type CSI report configurations that is comprised by the assistance information used for CSI report configurations is less than the number of maximum first-type CSI report configurations being supported.

In one embodiment, the first capability information is used for indicating the computing capability of the first node U01.

In one embodiment, the first capability information is or comprises an uplink RRC message.

In one embodiment, when transmitting the first capability information, the first node U01 has never experienced internal overheating.

In one embodiment, the first capability information comprises a maximum number of first-type indexes.

In one embodiment, the first capability information comprises a maximum number of first-type indexes.

In one embodiment, each first-type index is associated with at least one first-type CSI report configuration.

In one embodiment, each first-type CSI report configuration is used for configuring a first-type CSI.

In one embodiment, first-type CSIs configured by first-type CSI report configurations associated with a same first-type index are associated with a same generator.

In one embodiment, the first capability information comprises a number of generators used for generating CSIs configured by first-type CSI report configurations.

In one embodiment, the first capability information comprises a first capability parameter.

In one embodiment, the step S5101 is taken before the step S5105.

In one embodiment, the first message indicates a first capability parameter.

In one embodiment, the transmitting? first overheating assistance information comprises a second capability parameter.

In one embodiment, the first capability parameter and the second capability parameter are respectively used for indicating computing capabilities.

In one embodiment, a computing capability indicated by the second capability parameter is lower than a computing capability indicated by the first capability parameter.

In one embodiment, the second capability parameter is a percentage value.

In one embodiment, the first capability parameter indicates 100% of the computing capability of the first node U01, while the second capability parameter indicates a computing capability less than 100%.

In one embodiment, the above method is advantageous in that based on an indication of the capability baseline for real scenarios, a number of more conventional nominal floating-point operations can better describe the UE's capability.

In one embodiment, the third signaling can be transmitted before the second signaling, but can also be transmitted after the second signaling.

In one embodiment, the third signaling can be received before the second signaling, but can also be received after the second signaling.

In one embodiment, the first signaling and the second signaling are encapsulated in a same RRC message.

In one embodiment, the first signaling and the second signaling are encapsulated in different RRC messages.

In one embodiment, the first signaling and the third signaling are encapsulated in a same RRC message.

In one embodiment, the first signaling and the third signaling are encapsulated in different RRC messages.

In one embodiment, the third signaling and the second signaling are encapsulated in a same RRC message.

In one embodiment, the third signaling and the second signaling are encapsulated in different RRC messages.

In one embodiment, the first signaling, the second signaling and the third signaling are encapsulated in a same RRC message.

In one embodiment, the first signaling, the second signaling and the third signaling are encapsulated in different RRC messages.

In one embodiment, the third signaling indicates a first measurement report configuration.

In one embodiment, a time requirement for the first measurement report configuration is a first time length.

In one embodiment, the phrase that the first overheating assistance information comprising assistance information used for CSI report configuration includes a meaning that the first overheating assistance information indicates a second time length, the second time length being a time requirement preferred by the first measurement report configuration.

In one embodiment, the third signaling comprises an RRC message.

In one embodiment, the third signaling comprises at least partial fields in a RRCReconfiguration message.

In one embodiment, the third signaling comprises CSI-ReportConfig.

In one embodiment, the third signaling comprises MeasObjectNR.

In one embodiment, a time requirement for the first measurement report configuration is a time requirement for completing measurement reports configured by the first measurement report configuration.

In one embodiment, a time requirement for the first measurement report configuration is a maximum delay for completing measurement reports configured by the first measurement report configuration.

In one embodiment, a time requirement for the first measurement report configuration is a time requirement for transmitting measurement reports configured by the first measurement report configuration.

In one embodiment, a time requirement for the first measurement report configuration is a maximum delay for transmitting measurement reports configured by the first measurement report configuration.

In one embodiment, completing measurement reports configured by the first measurement report configuration includes completing training of a corresponding generator.

In one embodiment, completing measurement reports configured by the first measurement report configuration includes a corresponding generator completing computing.

In one embodiment, completing measurement reports configured by the first measurement report configuration includes a corresponding generator completing quantization.

In one embodiment, completing measurement reports configured by the first measurement report configuration includes generating CSI.

In one embodiment, the second time length is larger than the first time length.

In one embodiment, the time requirement is a periodicity of the first measurement report configuration.

In one embodiment, the time requirement is a maximum delay for completing measurement reports according to the first measurement report configuration.

In one embodiment, the time requirement is a maximum delay for transmitting measurement reports according to the first measurement report configuration.

In one embodiment, the time requirement is a maximum delay for completing training of a corresponding generator according to the first measurement report configuration.

In one embodiment, the time requirement is a maximum delay for completing initialization of a corresponding generator according to the first measurement report configuration.

In one embodiment, transmitting a first message before the action of transmitting first overheating assistance information, the first message being used to indicate a third time length, the third time length being a duration of completing measurement reports configured based on a basic measurement report configuration.

In one embodiment, the first capability information comprises the third time length.

In one embodiment, the first capability parameter comprises the third time length.

In one embodiment, the second time length is smaller than the third time length.

In one embodiment, the first measurement report configuration is used for configuring the first-type CSIs.

In one embodiment, the first measurement report configuration is used for configuring a measurement report other than the first-type CSIs.

In one embodiment, the third signaling indicates a second measurement report configuration.

In one embodiment, the second measurement report configuration comprises a precision requirement for CSI reports.

In one embodiment, the phrase that the first overheating assistance information comprising assistance information used for CSI report configuration includes a meaning that the first overheating assistance information indicates a first parameter, the first parameter being one of a predicting accuracy, a predicting number, a predicting model, a spatial configuration of positioning or integrity of positioning.

In one embodiment, the second measurement report configuration is used for configuring the first-type CSIs.

In one embodiment, the second measurement report configuration is used for configuring a measurement report other than the first-type CSIs.

In one embodiment, the second measurement report configuration is used for configuring a measurement related to beam prediction.

In one embodiment, the second measurement report configuration is used for configuring a measurement related to beam failure recovery.

In one embodiment, the second measurement report configuration is used for configuring a measurement related to radio link monitoring.

In one embodiment, the second measurement report configuration is used for configuring a measurement related to beam management.

In one embodiment, the second measurement report configuration is used for configuring a measurement related to cell quality.

In one embodiment, the second measurement report configuration is used for configuring a measurement related to L1/L2 handover.

In one embodiment, the second measurement report configuration is used for configuring a measurement related to positioning.

In one embodiment, the second measurement report configuration is used for configuring a measurement related to positioning prediction.

In one embodiment, the second measurement report configuration is used for configuring a measurement related to an electromagnetic environment, for instance, the electromagnetic environment prediction.

In one embodiment, the second measurement report configuration is used for configuring a measurement related to a sidelink, for instance, positioning in the sidelink.

In one subembodiment, downlink RS resources on which measurement reports configured by the second measurement report configuration are based are positioning RS (PRS) resources.

In one embodiment, a generator corresponding to measurement reports configured by the second measurement report configuration is a generator different from the same generator being associated with first-type CSIs configured by a first-type CSI report configuration associated with a same first-type index.

In one embodiment, measurement reports configured by the second measurement report configuration are transmitted by a PUCCH.

In one embodiment, measurement reports configured by the second measurement report configuration are transmitted by a PUSCH.

In one embodiment, measurement reports configured by the second measurement report configuration are encapsulated in an RRC message to be transmitted.

In one embodiment, the spatial configuration of positioning includes 2-dimensional (2D) positioning and 3D positioning.

In one embodiment, the integrity of positioning is used for depicting the reliability of positioning.

In one embodiment, measurement reports configured by the second measurement report configuration are predicting information.

In one embodiment, measurement reports configured by the second measurement report configuration are predictions of the future rather than reports of previous data.

In one embodiment, measurement reports configured by the second measurement report configuration are related to predicting failure.

In one embodiment, measurement reports configured by the second measurement report configuration are related to predicting beam failure.

In one embodiment, measurement reports configured by the second measurement report configuration are related to predicting radio link failure.

In one embodiment, measurement reports configured by the second measurement report configuration are related to predicting handover failure.

In one embodiment, measurement reports configured by the second measurement report configuration are related to predicting internal failure.

In one embodiment, measurement reports configured by the second measurement report configuration are related to predicting or monitoring internally co-existing failures.

In one embodiment, the predicting model refers to a type of predicting model.

In one embodiment, the predicting model refers to a number of predicting models.

In one embodiment, the predicting model refers to specific predicting model and predicting algorithm.

In one embodiment, before detecting an internal overheating, the first node U01 transmits a second parameter, the second parameter being one of a predicting accuracy, a predicting number, a predicting model, a spatial configuration of positioning or integrity of positioning; the first parameter and the second parameter are the same kind of parameters, for instance, the first parameter and the second parameter are both predicting models, or, the first parameter and the second parameter are both predicting numbers, where the first parameter is relatively looser than the second parameter or is more narrowed down.

In one embodiment, the step S5104 is no later than the step S5103.

In one embodiment, the step S5104 is no later than the step S5105.

In one embodiment, the step S5104 is no later than the step S5102.

In one embodiment, the second signaling indicates a downlink reference signal resource set.

In one embodiment, the phrase that the first overheating assistance information comprising assistance information used for CSI report configuration includes a meaning that the first overheating assistance information indicates a first downlink reference signal resource subset, and that a measurement of the downlink reference signal (RS) resource subset is used for generating first-type CSIs; the downlink reference signal resource set comprises at least one reference signal resource other than the downlink reference signal resource subset.

In one embodiment, the sentence that the downlink reference signal resource set comprises at least one reference signal resource other than the downlink reference signal resource subset means that: the downlink reference signal resource subset is a proper subset of the downlink reference signal resource set.

In one embodiment, when the first node gets overheated, with some AI-ML-based algorithm, it can use fewer reference signals, and thus can reduce the computing amount, to the benefit of mitigating overheating.

In one embodiment, the phrase that the first overheating assistance information comprising assistance information used for CSI report configuration includes a meaning that the first overheating assistance information requests configuring of more downlink reference signal resources for generating first-type CSIs.

In one embodiment, an advantage of the above method is that: For some AI/ML algorithm, a larger input will reduce the difficulty of predicting, which thus reduces a forecasted computing amount, to the benefit of mitigating overheating.

In one embodiment, the first node U01 transmits second overheating assistance information as a response to no longer experiencing internal overheating; the second overheating assistance information comprising assistance information used for CSI report configuration.

In one embodiment, assistance information for CSI report configurations comprised in the second overheating assistance information is different from assistance information for CSI report configurations comprised in the first overheating assistance information.

In one embodiment, a computing capability indicated by assistance information for CSI report configurations comprised in the second overheating assistance information is stronger than a computing capability indicated by assistance information for CSI report configurations comprised in the first overheating assistance information.

In one embodiment, configuration preferences for a maximum number of first-type CSI report configurations indicated by assistance information for CSI report configuration comprised in the second overheating assistance information are more than configuration preferences for a maximum number of first-type CSI report configurations indicated by assistance information for CSI report configuration comprised in the first overheating assistance information.

In one embodiment, configuration preferences for a maximum number of first-type CSI report configurations indicated by assistance information for CSI report configuration comprised in the second overheating assistance information are more than configuration preferences for a maximum number of first-type CSI report configurations indicated by assistance information for CSI report configuration comprised in the first overheating assistance information.

In one embodiment, configuration preferences for a maximum number of first-type indexes indicated by assistance information for CSI report configuration comprised in the second overheating assistance information are more than configuration preferences for a maximum number of first-type indexes indicated by assistance information for CSI report configuration comprised in the first overheating assistance information.

In one embodiment, configuration preferences for a maximum number of first-type indexes indicated by assistance information for CSI report configuration comprised in the second overheating assistance information are more than configuration preferences for a maximum number of first-type indexes indicated by assistance information for CSI report configuration comprised in the first overheating assistance information.

In one embodiment, the above method is advantageous in supporting progressive configuration updating, for avoidance of the situation in which a rapid growth of computing amount after being relieved from overheating will result in a next overheating.

In one embodiment, the second overheating assistance information is transmitted on a Physical Uplink Shared CHannel (PUSCH).

In one embodiment, the second overheating assistance information comprises a Radio Resource Control (RRC) Information Element (IE).

In one embodiment, the second overheating assistance information is an information element (IE) in an RRC message.

In one embodiment, the second overheating assistance information is or comprises an OverheatingAssistance IE.

In one embodiment, an RRC message carrying the second overheating assistance information is a UEAssistanceInformation message.

In one embodiment, the second overheating assistance information is transmitted on an uplink dedicated control channel (DCCH).

In one embodiment, the step S5106 is later than the step S5105.

Embodiment 6

Figure 6:
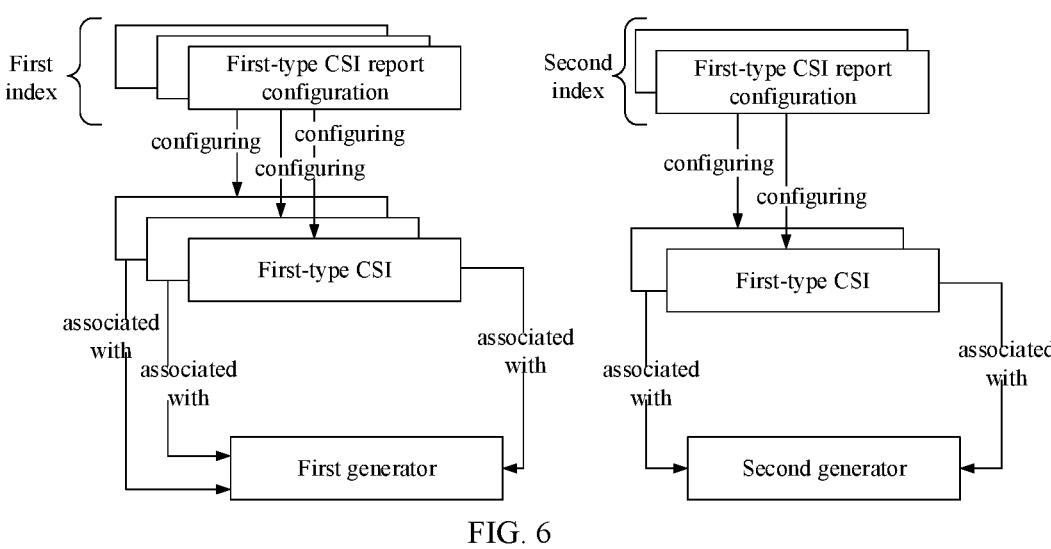
FIG. 6 illustrates a schematic diagram of a first index according to one embodiment of the present application.

Embodiment 6 illustrates a schematic diagram of a first index according to one embodiment of the present application, as shown in FIG. 6.

In one embodiment, the first node is configured with K CSI report configuration groups, where K is a positive integer, any of the K CSI report configuration groups comprising at least one first-type CSI report configuration; all first-type CSI report configurations comprised by any of the K CSI report configuration groups are only associated with one first-type index.

In one embodiment, a first index in FIG. 6 belongs to first-type indexes.

In one embodiment, a second index in FIG. 6 belongs to first-type indexes.

In one embodiment, each first-type CSI report configuration has its own identity.

In one embodiment, the first-type CSI report configuration is a CSI report configuring non-codebook.

In one embodiment, the first-type CSI report configuration is used for configuring first-type CSI.

In one embodiment, FIG. 6 illustrates two CSI report configuration groups of the K CSI report configuration groups.

In one subembodiment, FIG. 6 does not restrict the value of K.

In one embodiment, K is equal to 2.

In one embodiment, the first index is associated with a group of first-type CSI report configurations; the group of first-type CSI report configurations are only associated with the first index rather than being associated with the second index; the second index is associated with another group of first-type CSI report configurations; the other group of first-type CSI report configurations are only associated with the second index rather than being associated with the first index.

In one embodiment, the first-type index is used for identifying a generator.

In one embodiment, the first-type index is an identity of an AI/ML-based generator.

In one embodiment, the first-type index is used for identifying a group of configurations.

In one subembodiment, the group of configurations are for AI/ML.

In one embodiment, the first-type index is used for identifying a TCI.

In one embodiment, the first-type index is associated with an AI/ML-related parameter.

In one embodiment, the first-type index is used for identifying a decoder.

In one subembodiment, the decoder is a decoder related to AI or ML.

In one embodiment, a first-type CSI report configuration is used for configuring a first-type CSI.

In one subembodiment, there are as many first-type CSI report configurations as there are first-type CSIs.

In one embodiment, each first-type CSI is associated with one and only generator.

In one embodiment, a first generator and a second generator in FIG. 6 are both generators used for generating first-type CSIs.

In one embodiment, a first CSI report configuration group in FIG. 6 comprises 3 first-type CSI report configurations, which correspond to 3 first-type CSIs, each of the three first-type CSIs being associated with a first index, and each of the three first-type CSIs being associated with a first generator; a second CSI report configuration group in FIG. 6 comprises 2 first-type CSI report configurations, which correspond to 2 first-type CSIs, each of the two first-type CSIs being associated with a first index, and each of the two first-type CSIs being associated with a first generator; first-type CSI report configurations comprised in a CSI report configuration group are not limited by FIG. 6, where a number of first-type CSI report configurations comprised in a CSI report configuration group is N, N being a positive integer.

In one embodiment, the assistance information used for CSI report configurations comprises a configuration preference for a maximum value of a first-type CSI report configuration associated with a first-type index.

Embodiment 7

Figure 7:
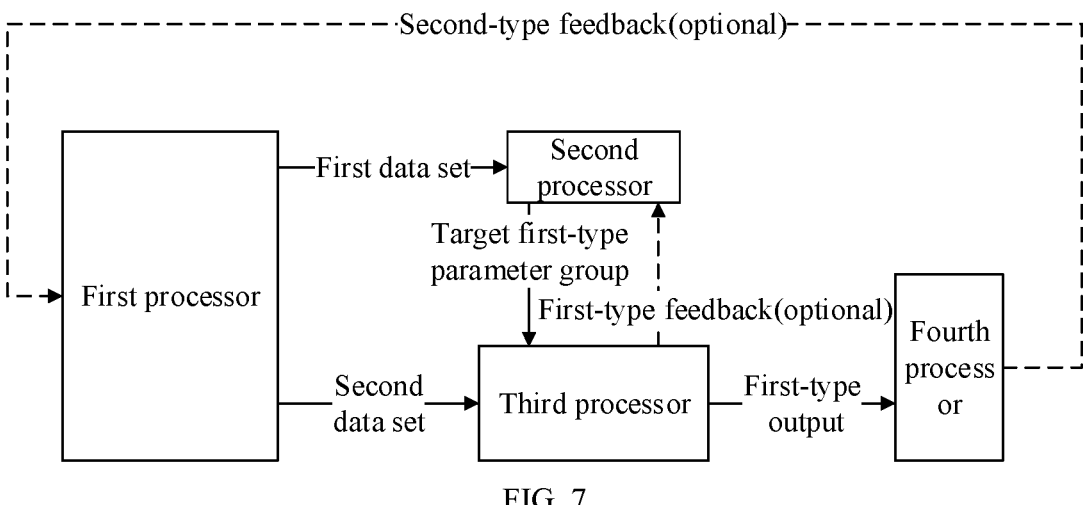
FIG. 7 illustrates a schematic diagram of an AI processing system according to one embodiment of the present application.

Embodiment 7 illustrates a schematic diagram of an AI processing system according to one embodiment of the present application, as shown in FIG. 7. FIG. 7 comprises a first processor, a second processor, a third processor and a fourth processor.

In Embodiment 7, the first processor transmits a first data set to the second processor, and the second processor generates a target first-type parameter group according to the first data set, and then the second processor transmits the generated target first-type parameter group to the third processor, and the third processor utilizes the target first-type parameter group to process the second data set for obtaining a first-type output, and transmits the first-type output to the fourth processor.

In one embodiment, the third processor transmits first-type feedback to the second processor, the first-type feedback being used to trigger re-computing or updating the target first-type parameter group.

In one embodiment, the fourth processor transmits second-type feedback to the first processor, the second-type feedback being used to generate the first data set or the second data set, or the second-type feedback being used to trigger a transmission of the first data set or the second data set.

In one embodiment, the first processor generates the first data set and the second data set according to a measurement of a first radio signal, the first radio signal comprising a first reference signal.

In one embodiment, the first processor and the third processor belong to a first node, while the fourth processor belongs to a second node, where the first-type output comprises first channel information of a first type.

In one embodiment, the second processor belongs to a first node.

The above embodiment avoids a delivery of the first data set to a second node.

In one embodiment, the second processor belongs to a second node.

The above embodiment reduces the complexity of the first node.

In one embodiment, the first data set is Training Data, while the second data set is Inference Data, the second processor being used for training a model, the model trained being described by the target first-type parameter group.

In one embodiment, the third processor constructs a model according to the target first-type parameter group, and then inputs the second data set to the model constructed to obtain the first-type output, and transmits the first-type output to the fourth processor.

In one subembodiment, the third processor comprises a first encoder in the present application, the first encoder being described by the target first-type parameter group, and generation of the first-type output being performed by the first encoder.

In one embodiment, the third processor computes an error between the first-type output and actual data for determining the performance of the trained model; the actual data is data delivered from the first processor that is received after the second data set.

The above embodiment particularly applies to prediction-related reporting.

In one embodiment, the third processor recovers a reference data set according to the first-type output, where an error between the reference data set and the second data set is used for generating the first-type feedback.

The recovery of the reference data set usually uses the inverse operation similar to the target first-type parameter group, and the embodiment above particularly applies to CSI Compression-related reporting.

In one embodiment, the first-type feedback is used for reflecting the performance of the trained model; when the performance of the trained model cannot meet requirements, the second processor will re-compute the target first-type parameter group.

In one subembodiment, the third processor comprises a first reference decoder in the present application, the first reference decoder being depicted by the target first-type parameter group. An input to the first reference decoder comprises the first-type output, and an output of the first reference decoder comprises the reference data set.

Typically, when the error is too large or there's been no update for too long, the performance of the trained model is assumed to be unsatisfactory.

In one embodiment, the third processor belonging to a second node, the first node reports the target first-type parameter group to the second node.

In one embodiment, the first adjustment in the present application is generated by the second processor.

In one embodiment, the first adjustment in the present application is generated by the third processor.

In one subembodiment of any of the above two embodiments, the first adjustment is associated with the first encoder.

Based on the above embodiments, the generation of the first adjustment may depend on implementations of all kinds of hardcore producers, where a non-restrictive implementing method is given as follows:

The second processor or the third processor computes a correlation between an input to a first encoder and an output by a first reference decoder (as depicted by the target first-type parameter group), and then determines the first adjustment according to the correlation. The input to the first encoder and the output by the first reference decoder are both pre-coding matrixes (including pre-coding vectors), where the correlation can be described for instance using a difference of 1 minus a Normalized Mean Square Error (NMSE) or a Generalized Cosine Similarity (GCS).

In one embodiment, with the probability of r1 the correlation is no less than the first adjustment, r1 being a real number greater than 0 and less than 1.

In one embodiment, the r1 is fixed.

In one embodiment, the r1 is configurable.

In one embodiment, the r1 is greater than 0.5.

In one embodiment, the first-type index is associated with a target first-type parameter group.

In one embodiment, the first-type index is associated with the third processor.

In one embodiment, the first-type index is associated with an Inference model.

In one embodiment, the first-type index is associated with configurations of an Inference model.

In one embodiment, the first-type index is an index of an inference configuration.

In one embodiment, the first-type output comprises the first-type CSIs.

In one embodiment, a group of inference configurations can be indexed by the first-type indexes.

In one embodiment, an inference model can be indexed by the first-type index.

Embodiment 8

Figure 8:
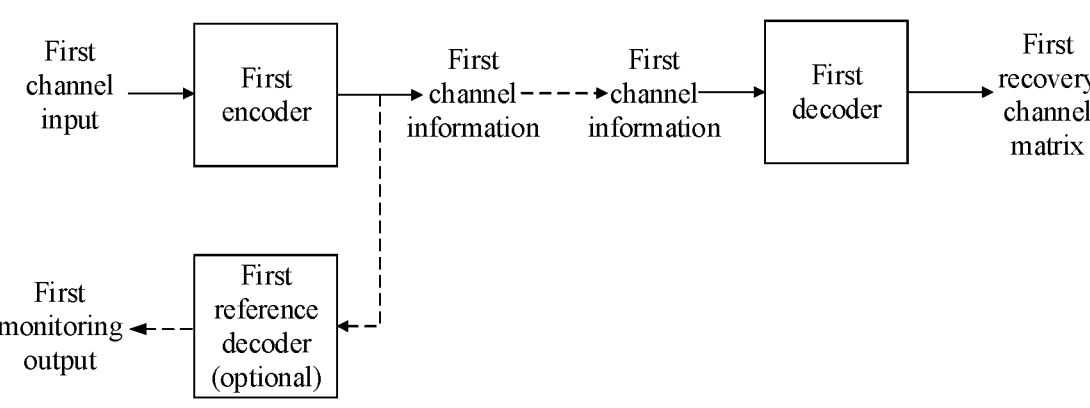
FIG. 8 illustrates a flowchart of transmission of first channel information according to one embodiment of the present application.

Embodiment 8 illustrates a flowchart of transmission of first channel information according to one embodiment of the present application, as shown in FIG. 8. In FIG. 8, a first reference decoder is optional.

In Embodiment 8, a first encoder and a first decoder respectively belong to a first node and a second node; herein, the first encoder belongs to a first receiver, while the first decoder belongs to a second receiver.

The first receiver utilizes the first encoder for generating the first channel information; herein, an input to the first encoder comprises the first channel input, the first encoder being obtained through training; the first channel input being obtained through a measurement of a first reference signal;

the first node sends the first channel information as feedback to the second node via an air interface;

the second receiver utilizes the first decoder for generating a first recovery channel matrix; herein, an input to the first decoder comprises the first channel information, the first decoder being obtained through training.

Theoretically, the first encoder and the first decoder shall be seen as reciprocal operations to ensure that the first channel input is identical to the first recovery channel matrix; however, due to factors such as the complexity of implementation or radio overhead or delay, the first encoder and the first decoder in Embodiment 8 cannot guarantee a complete offset, so it cannot be ensured that the first channel input is totally the same as the first recovery channel matrix, leading to a result that the conventional way of computing Channel Quality Indicator (CQI) is no longer applicable, namely, it is impossible to find a precoding matrix for CQI computing, of which both sides have a consistent understanding.

In one embodiment, the first channel input is a channel parameter matrix, or, a matrix consisting of at least one Eigen vector.

In one embodiment, the first channel input is a first channel matrix.

In the above embodiments, the estimation of a first CQI is probably too optimistic, for which the corresponding compensation may be done through a first adjustment, or be adjusted by the second node itself.

In one subembodiment, compared with not using the first adjustment, the application of the first adjustment makes the first CQI lower or unchanged.

In one embodiment, the first channel matrix is a pre-coding matrix used for computing a CQI based on the assumption that the type of the first channel information is PMI.

In the above embodiment, the specific implementation is to implement by the hardcore manufacturer itself, for instance, to select a precoding vector or precoding matrix sharing a maximum Generalized Cosine Similarity with the first channel input in a candidate codebook to serve as a first channel matrix, or, to select a precoding vector or precoding matrix sharing a minimum NMSE with the first channel input in a candidate codebook to serve as a first channel matrix; a typical candidate codebook is related to a number of layers of the first channel matrix, for the candidate codebook used by an NR system, refer to TS38.214, Section 5.2.2.2.

In the above embodiments, the estimation of a first CQI is probably too conservative, for which the corresponding compensation may be done through a first adjustment, or be adjusted by the second node itself.

In one subembodiment, compared with not using the first adjustment, the application of the first adjustment makes the first CQI value higher or unchanged.

In one embodiment, the first receiver also comprises a first reference decoder, where an input to the first reference decoder comprises the first channel information, and an output by the first reference decoder comprises a first monitored output.

In one embodiment, the first channel matrix is the first monitored output, where the first reference decoder and the first decoder cannot be assumed to be identical.

In the above embodiment, the first reference decoder and the first decoder are probably independently generated or independently maintained, therefore, even if they both aim to perform an inverse operation of the first encoder, they are more likely to be similar rather than the same.

In one subembodiment, the first reference decoder is similar to the first decoder, so a CQI error caused by a difference between them is adjusted by the second node itself.

In one subembodiment, a CQI error caused by a difference between the first reference decoder and the first decoder is adjusted by a first adjustment.

In one embodiment, the first receiver comprises a third processor in Embodiment 7.

In one embodiment, the first channel input belongs to a second data set in Embodiment 7.

In one embodiment, a training for the first encoder is used to determine the first adjustment.

In one subembodiment, the training for the first encoder is used for obtaining the first encoder and the first reference decoder.

In one embodiment, the training for the first encoder is performed in the first node.

In one embodiment, the training for the first encoder is performed by the second node.

In one embodiment, the first recovery channel matrix is only known to the second node.

In one embodiment, the first recovery channel matrix and the first channel matrix cannot be assumed to be identical.

In one embodiment, the first-type index is associated with a first encoder.

In one embodiment, the first-type index is an index or identity of a first encoder.

In one embodiment, the first encoder is indexed by the first-type index.

In one embodiment, the first encoder can be indexed by the first-type index.

In one embodiment, the first channel information is the first-type CSI.

In one embodiment, the first-type index is associated with a first decoder.

In one embodiment, a first channel input comprises a measurement result of downlink RS resources.

In one embodiment, the first-type index is associated with a first reference decoder.

In one embodiment, the first-type index is an index or identity of a first reference decoder.

In one embodiment, the first reference decoder is indexed by the first-type index.

In one embodiment, the first reference decoder can be indexed by the first-type index.

In one embodiment, the assistance information used for CSI report configuration comprised by the first overheating assistance information comprises a preference for a maximum value of a number of first reference decoders.

Embodiment 9

Figure 9:
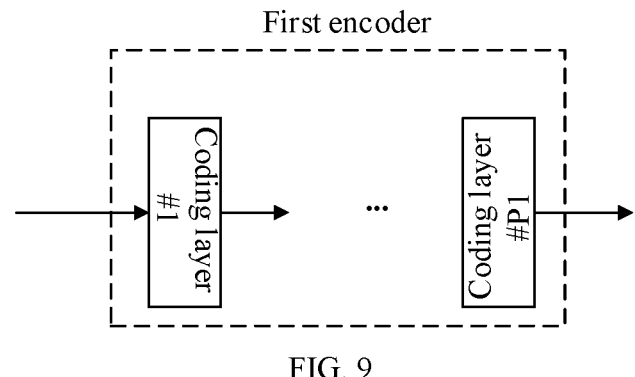
FIG. 9 illustrates a schematic diagram of a first encoder according to one embodiment of the present application.

Embodiment 9 illustrates a schematic diagram of a first encoder according to one embodiment of the present application, as shown in FIG. 9. In FIG. 9, the first encoder comprises P1 coding layers, namely, coding layers #1, #2 . . . and #P1.

In one embodiment, P1 is 2, namely, the P1 coding layers include a coding layer #1 and a coding layer #2, the coding layer #1 and the coding layer #2 respectively being a Convolutional layer and a Fully Connected layer. At the Convolutional layer, at least one convolutional kernel is used for convoluting the first channel input for generating corresponding Eigen map(s), and at least one Eigen map output by the convolutional layer is/are reshaped as a vector to be input to a Fully Connected layer; while the Fully Connected layer converts the vector into first channel information. For more detailed descriptions, refer to technical literature of CNN, for instance, Chao-Kai Wen, Deep Learning for Massive MIMO CSI Feedback, IEEE WIRELESS COMMUNICATIONS LETTERS, VOL. 7, NO. 5, OCTOBER 2018, etc.

In one embodiment, P1 is 3, namely, the P1 coding layers are respectively a Fully Connected layer, a Convolutional layer and a Pooling layer.

In one embodiment, the assistance information used for CSI report configuration comprised by the first overheating assistance information comprises a preference for a maximum number of coding layers.

In one embodiment, the assistance information used for CSI report configuration comprised by the first overheating assistance information comprises a preference for P1 or P2.

Embodiment 10

Figure 10:
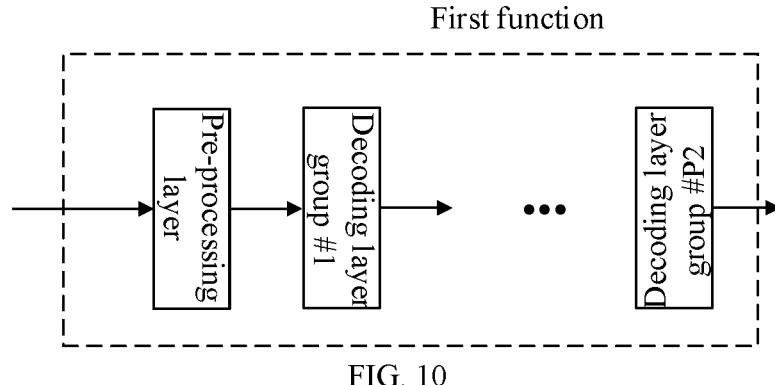
FIG. 10 illustrates a schematic diagram of a first function according to one embodiment of the present application.

Embodiment 10 illustrates a schematic diagram of a first function according to one embodiment of the present application, as shown in FIG. 10. In FIG. 10, the first function comprises a pre-processing layer, as well as P2 decoding layer groups, i.e., decoding layer groups #1, #2, . . . #P2, where each decoding layer group comprises at least one decoding layer.

The structure of the first function is applicable to a first decoder and a first reference decoder in Embodiment 8.

In one embodiment, the pre-processing layer is a Fully Connected layer, which is to expand a size of the first channel information to a size of the first channel input.

In one embodiment, any two decoding layer groups among the P2 decoding layer groups have identical structures, where the structure comprises a number of decoding layers being comprised, as well as the size of an input parameter and the size of an output parameter of each decoding layer being comprised.

In one embodiment, a second node indicates the P2 and the structure of the decoding layer groups to a first node, and the first node indicates other parameters of the first function via the second signaling.

In one embodiment, the other parameters include at least one of a threshold of activation function, a size of convolutional kernel, a step-size of convolutional kernel, or a weight among Eigen maps.

In one embodiment, the first-type indexes are an input to the first function.

In one embodiment, the first-type indexes are an output of the first function.

In one embodiment, the first-type indexes are associated with the first function.

In one embodiment, the first-type indexes are indexes of the first function.

In one embodiment, the first function is indexed by the first-type indexes.

In one embodiment, the first function can be indexed by the first-type indexes.

In one embodiment, the assistance information used for CSI report configuration comprised by the first overheating assistance information comprises a preference for a quantization accuracy of first-type CSI report configurations.

Embodiment 11

Figure 11:
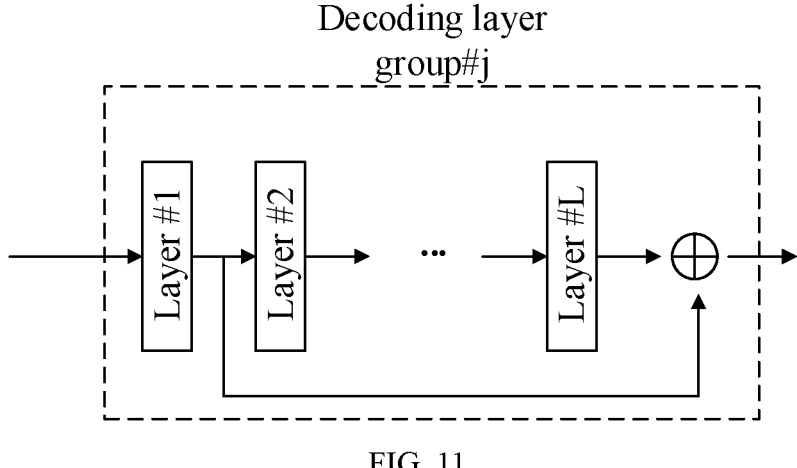
FIG. 11 illustrates a schematic diagram of a decoding layer group according to one embodiment of the present application.

Embodiment 11 illustrates a schematic diagram of a decoding layer group according to one embodiment of the present application, as shown in FIG. 11. In FIG. 11, a decoding layer group #j comprises L layers, namely, Layer #1, #2, . . . , and #L; the decoding layer group is any decoding layer group among the P2 decoding layer groups.

In one embodiment, L is 4; a first layer among the L layers is an input layer, while the last three of them are convolutional layers; for more detailed descriptions, refer to technical literature of CNN, for instance, Chao-Kai Wen, Deep Learning for Massive MIMO CSI Feedback, IEEE WIRELESS COMMUNICATIONS LETTERS, VOL. 7, NO. 5, OCTOBER 2018, etc.

In one embodiment, the L layers include at least one convolutional layer and a pooling layer.

Embodiment 12

Figure 12:
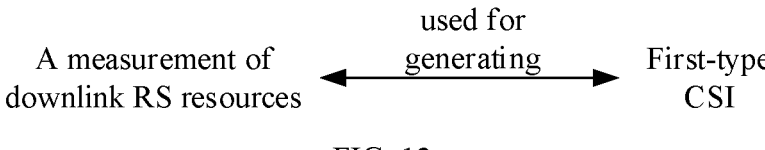
FIG. 12 illustrates a schematic diagram of a measurement of downlink RS resources being used for generating first-type CSIs according to one embodiment of the present application.

Embodiment 12 illustrates a schematic diagram of a measurement of downlink RS resources being used for generating first-type CSIs according to one embodiment of the present application, as shown in FIG. 12.

In one embodiment, the network configures downlink RS resources used for measurement.

In one embodiment, the network configures one or multiple groups of downlink RS resources used for measurement.

In one embodiment, a first-type CSI report configuration corresponds to a group of downlink RS resources.

In one embodiment, the network configures a time-domain position and a frequency-domain position of downlink RS resources used for measurement.

In one embodiment, the first node performs measurements on configured downlink RS resources.

In one embodiment, a result of the first node performing measurements on configured downlink RS resources is used for generating first-type CSIs.

In one embodiment, the first node uses a function to process measurement results on downlink RS resources for generating first-type CSIs.

In one embodiment, the first node uses an AI/ML-based method to process measurement results on downlink RS resources for generating first-type CSIs.

In one embodiment, the first node uses a method shown in one embodiment provided in Embodiments 7-11 to process measurement results on downlink RS resources for generating first-type CSIs.

Embodiment 13

Figure 13:
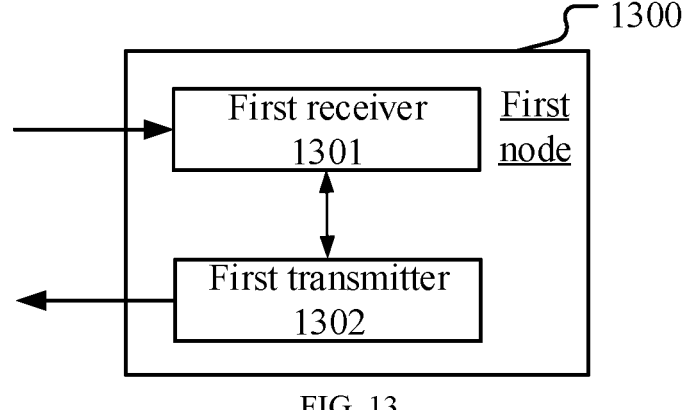
FIG. 13 illustrates a structure block diagram of a processing device in a first node according to one embodiment of the present application.

Embodiment 13 illustrates a structure block diagram of a processing device used in a first node according to one embodiment of the present application; as shown in FIG. 13. In FIG. 13, a processing device 1300 in a first node comprises a first receiver 1301 and a first transmitter 1302. In Embodiment 13, the first receiver 1301 receives a first signaling, the first signaling being used for configuring the first node 1300 to provide overheating assistance information; and the first transmitter 1302, upon reception of the first signaling, transmits first overheating assistance information as a response to any condition in a first condition set being satisfied;

herein, the first condition set comprises an overheating condition being satisfied; the first overheating assistance information comprises assistance information used for Channel State Information (CSI) report configurations.

In one embodiment, the assistance information used for CSI report configurations comprises a configuration preference for a maximum number of first-type CSI report configurations, and a measurement of downlink RS resources is used for generating first-type CSIs, where a first-type CSI is configured by a first-type CSI report configuration.

In one embodiment, the assistance information used for CSI report configurations comprises a configuration preference for a maximum number of first-type indexes, where each first-type index is associated with at least one first-type CSI report configuration, and each first-type CSI report configuration is used for configuring one first-type CSI, first-type CSIs configured by first-type CSI report configurations associated with a same first-type index are associated with a same generator, and a measurement of downlink RS resources is used for generating the first-type CSIs.

In one embodiment, the first receiver 1301 receives a second signaling, the second signaling indicating a downlink reference signal resource set;

herein, the phrase that the first overheating assistance information comprising assistance information used for CSI report configuration includes a meaning that the first overheating assistance information indicates a first downlink reference signal resource subset, and that a measurement of the downlink reference signal resource subset is used for generating first-type CSIs; the downlink reference signal resource set comprises at least one reference signal resource other than the downlink reference signal resource subset.

In one embodiment, the first receiver 1301 receives a third signaling, the third signaling indicating a first measurement report configuration, where a time requirement for the first measurement report configuration is a first time length; the phrase that the second overheating assistance information comprising assistance information used for CSI report configuration includes a meaning that the first overheating assistance information indicates a second time length, the second time length being a time requirement preferred by the first measurement report configuration.

In one embodiment, the first receiver 1301 receives a third signaling, the third signaling indicating a second measurement report configuration, the second measurement report configuration comprising an accuracy requirement for CSI reports; the phrase that the second overheating assistance information comprising assistance information used for CSI report configuration includes a meaning that the first overheating assistance information indicates a first parameter, the first parameter being one of a predicting accuracy, a predicting number, a predicting model, a spatial configuration of positioning or integrity of positioning.

In one embodiment, the first transmitter 1302 transmits second overheating assistance information as a response to no longer experiencing internal overheating; the second overheating assistance information comprising assistance information used for CSI report configuration.

In one embodiment, the first transmitter 1302 transmits a first message before the action of transmitting first overheating assistance information, the first message indicating a first capability parameter;

herein, the first overheating assistance information comprises a second capability parameter; the first capability parameter and the second capability parameter are respectively used for indicating computing capabilities.

In one embodiment, the first node is a UE.

In one embodiment, the first node is a terminal supporting large delay difference.

In one embodiment, the first node is a terminal supporting NTN.

In one embodiment, the first node is an aircraft or vessel.

In one embodiment, the first node is a cellphone or vehicle-mounted terminal.

In one embodiment, the first node is a relay UE and/or a U2N remote UE.

In one embodiment, the first node is an IoT terminal or IIoT terminal.

In one embodiment, the first node is a piece of equipment supporting transmissions with low delay and high reliability.

In one embodiment, the first node is a sidelink communication node.

In one embodiment, the first receiver 1301 comprises at least one of the antenna 452, the receiver 454, the receiving processor 456, the multi-antenna receiving processor 458, the controller/processor 459, the memory 460 or the data source 467 in Embodiment 4.

In one embodiment, the first transmitter 1302 comprises at least one of the antenna 452, the transmitter 454, the transmitting processor 468, the multi-antenna transmitting processor 457, the controller/processor 459, the memory 460 or the data source 467 in Embodiment 4.

Embodiment 14

Figure 14:
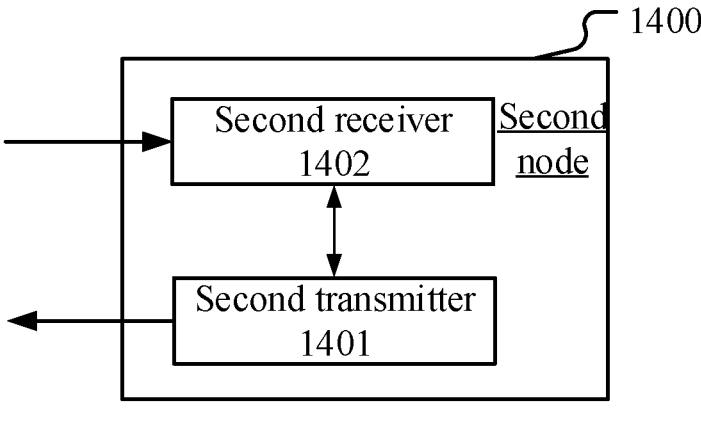
FIG. 14 illustrates a structure block diagram a processing device in a second node according to one embodiment of the present application.

Embodiment 14 illustrates a structure block diagram of a processing device used in a second node according to one embodiment of the present application; as shown in FIG. 14. In FIG. 14, a processing device 1400 in a second node comprises a second transmitter 1401 and a second receiver 1402. In Embodiment 14, the second transmitter 1401 transmits a first signaling, the first signaling being used for configuring a receiver of the first signaling to provide overheating assistance information; and the second receiver 1402 receives first overheating assistance information after the transmission of the first signaling;

herein, any condition in a first condition set being satisfied is used for triggering a transmission of the first overheating assistance information, and the first condition set comprises an overheating condition being satisfied; the first overheating assistance information comprises assistance information used for Channel State Information (CSI) report configurations.

In one embodiment, the assistance information used for CSI report configurations comprises a configuration preference for a maximum number of first-type CSI report configurations, and a measurement of downlink RS resources is used for generating first-type CSIs, where a first-type CSI is configured by a first-type CSI report configuration.

In one embodiment, the assistance information used for CSI report configurations comprises a configuration preference for a maximum number of first-type indexes, where each first-type index is associated with at least one first-type CSI report configuration, and each first-type CSI report configuration is used for configuring one first-type CSI, first-type CSIs configured by first-type CSI report configurations associated with a same first-type index are associated with a same generator, and a measurement of downlink RS resources is used for generating the first-type CSIs.

In one embodiment, the second transmitter 1401 transmits a second signaling, the second signaling indicating a downlink reference signal resource set;

herein, the phrase that the first overheating assistance information comprising assistance information used for CSI report configuration includes a meaning that the first overheating assistance information indicates a first downlink reference signal resource subset, and that a measurement of the downlink reference signal resource subset is used for generating first-type CSIs; the downlink reference signal resource set comprises at least one reference signal resource other than the downlink reference signal resource subset.

In one embodiment, the second transmitter 1401 transmits a third signaling, the third signaling indicating a first measurement report configuration, where a time requirement for the first measurement report configuration is a first time length; the phrase that the second overheating assistance information comprising assistance information used for CSI report configuration includes a meaning that the first overheating assistance information indicates a second time length, the second time length being a time requirement preferred by the first measurement report configuration.

In one embodiment, the second transmitter 1401 transmits a third signaling, the third signaling indicating a second measurement report configuration, the second measurement report configuration comprising an accuracy requirement for CSI reports; the phrase that the second overheating assistance information comprising assistance information used for CSI report configuration includes a meaning that the first overheating assistance information indicates a first parameter, the first parameter being one of a predicting accuracy, a predicting number, a predicting model, a spatial configuration of positioning or integrity of positioning.

In one embodiment, the second receiver 1402 receives second overheating assistance information; the second overheating assistance information comprising assistance information used for CSI report configuration, no longer experiencing internal overheating being used to trigger a transmission of the second overheating assistance information.

In one embodiment, the second receiver 1402 receives a first message before the action of receiving first overheating assistance information, the first message indicating a first capability parameter;

herein, the first overheating assistance information comprises a second capability parameter; the first capability parameter and the second capability parameter are respectively used for indicating computing capabilities.

In one embodiment, the second node is a satellite.

In one embodiment, the second node is an IoT node.

In one embodiment, the second node is a wearable node.

In one embodiment, the second node is a base station.

In one embodiment, the second node is a relay.

In one embodiment, the second node is an access point.

In one embodiment, the second node is a multicast-supporting node.

In one embodiment, the second node is a satellite.

In one embodiment, the second transmitter 1401 comprises at least one of the antenna 420, the transmitter 418, the transmitting processor 416, the multi-antenna transmitting processor 471, the controller/processor 475 or the memory 476 in Embodiment 4.

In one embodiment, the second receiver 1402 comprises at least one of the antenna 420, the receiver 418, the receiving processor 470, the multi-antenna receiving processor 472, the controller/processor 475 or the memory 476 in Embodiment 4.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present application is not limited to any combination of hardware and software in specific forms. The UE and terminal in the present application include but are not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things (IOT), RFID terminals, NB-IOT terminals, Machine Type Communication (MTC) terminals, enhanced MTC (eMTC) terminals, data cards, low-cost mobile phones, low-cost tablet computers, satellite communication equipment, ship communication equipment, and NTN UE, etc. The base station or system device in the present application includes but is not limited to macro-cellular base stations, micro-cellular base stations, home base stations, relay base station, gNB (NR node B), Transmitter Receiver Point (TRP), NTN base station, satellite equipment and fight platform, and other radio communication equipment.

This disclosure can be implemented in other designated forms without departing from the core features or fundamental characters thereof. The currently disclosed embodiments, in any case, are therefore to be regarded only in an illustrative, rather than a restrictive sense. The scope of invention shall be determined by the claims attached, rather than according to previous descriptions, and all changes made with equivalent meaning are intended to be included therein.

What is claimed is:

1. A user equipment (UE) for wireless communications, the UE comprising:

a transceiver; and a processor, wherein the transceiver and the processor are configured to:

transmit, prior to detecting overheating of the UE, a first message indicative of a total computing capability of the UE, receive a first Radio Resource Configuration (RRC) message comprising overheating configuration inormation, receive a second RRC message indicative of a downlink reference signal (RS) resource set, detect overheating of the UE, transmit, based on the overheating configuration information, first overheating assistance information used for one or more Channel State Information (CSI) report configurations, wherein the first overheating assistance information comprises an indication of a lower computing capability of the UE relative to the total computing capability of the UE, measure one or more downlink RS resources from the downlink RS resource set, and generate one or more Artificial Intelligence or Machine Learning (AI/ML) based CSI reports.

2. The UE according to claim 1, wherein the transceiver and the processor are further configured to:

determine a maximum number of AI/ML-based CSI report configurations, wherein the first overheating assistance information comprises an indication of the maximum number of AI/ML-based CSI report configurations, and generate the one or more AI/ML-based CSI reports based on an AI/ML-based CSI report configuration.

3. The UE according to claim 2, wherein the transceiver and the processor are further configured to:

measure a downlink RS resource subset from the downlink RS resource set, wherein the first overheating assistance information is indicative of the downlink RS resource subset, and wherein the downlink RS resource set comprises at least one RS resource other than the downlink RS resource subset.

4. The UE according to claim 2, wherein the transceiver and the processor are configured to:

receive a third RRC message indicative of a second measurement report configuration comprising an accuracy requirement for one or more CSI reports, and wherein the first overheating assistance information includes an indication of one of: a predicting accuracy, a predicting number, a predicting model, a spatial configuration of positioning, or integrity of positioning.

5. The UE according to claim 1, wherein the transceiver and the processor are further configured to:

determine a maximum number of indexes, wherein each index is associated with at least one AI/ML-based CSI report configuration, and wherein each AI/ML-based CSI report configuration is used for configuring one AI/ML CSI, and wherein the one or more AI/ML-based CSI reports configured by one or more AI/ML-based CSI report configurations associated with a same index are associated with a same generator, and wherein the first overheating assistance information comprises an indication of the maximum number of indexes, and generate the one or more first typeAI/ML-based CSI reports based on an index and corresponding AI/ML-based CSI report configuration.

6. The UE according to claim 5, wherein the transceiver and the processor are further configured to:

measure a downlink RS resource subset from the downlink RS resource set, wherein the first overheating assistance information is indicative of the downlink RS resource subset, and wherein the downlink RS resource set comprises at least one RS resource other than the downlink RS resource subset.

7. The UE according to claim 5, wherein the transceiver and the processor are configured to:

receive a third RRC message indicative of a second measurement report configuration comprising an accuracy requirement for one or more CSI reports, and wherein the first overheating assistance information comprises an indicates indication of one of: a predicting accuracy, a predicting number, a predicting model, a spatial configuration of positioning, or integrity of positioning.

8. The UE according to claim 1, wherein the transceiver and processor are further configured to:

measure a downlink RS resource subset from the downlink RS resource set, wherein the first overheating assistance information is indicative of the downlink RS resource subset, and wherein the downlink RS resource set comprises at least one RS resource other than the downlink RS resource subset.

9. The UE according to claim 1, wherein the transceiver and the processor are further configured to:

receive a third RRC message indicative of a first measurement report configuration, wherein a time requirement for the first measurement report configuration is a first duration, and wherein the first overheating assistance information indicates a second duration, and wherein the second duration is a time requirement preferred by the first measurement report configuration.

10. The UE according to claim 9, wherein the time requirement is a maximum delay for completing training or initialization of a corresponding generator according to the first measurement report configuration.

11. The UE according to claim 1, wherein the transceiver and the processor are further configured to:

receiving receive a third RRC message indicative of a second measurement report configuration comprising an accuracy requirement for one or more CSI reports, and wherein the first overheating assistance information comprises an indication of one of: a predicting accuracy, a predicting number, a predicting model, a spatial configuration of positioning, or integrity of positioning.

12. The UE according to claim 1, wherein the transceiver and the processor are further configured to:

detect that the UE is not overheating, and transmit second overheating assistance information, used for the one or more CSI report configurations.

13. The UE according to claim 1, wherein a number of indexes is identical to a number of generators of the one or more AI/ML-based CSI reports, and wherein one or more generators are based on AI/ML.

14. A method in a user equipment (UE) for wireless communications, the method comprising:

transmitting, prior to detecting overheating of the UE, a first message indicative of a total computing capability of the UE;

receiving a first Radio Resource Configuration (RRC) message comprising overheating configuration information;

receiving a second RRC message indicative of a downlink reference signal (RS) resource set;

detecting overheating of the UE;

transmitting, based on the overheating configuration information, first overheating assistance information used for one or more Channel State Information (CSI) report configurations, wherein the first overheating assistance information comprises an indication of a lower computing capability of the UE relative to the total computing capability of the UE;

measuring one or more downlink RS resources from the downlink RS resource set; and generating one or more Artificial Intelligence or Machine Learning (AI/ML) based CSI reports.

15. The method according to claim 14, further comprising:

determining a maximum number of AI/ML-based CSI report configurations, wherein the first overheating assistance information comprises an indication of the maximum number of AI/ML-based CSI report configurations; and generating the one or more AI/ML-based CSI reports based on an AI/ML-based CSI report configuration.

16. The method according to claim 14, further comprising:

determining a maximum number of indexes, wherein each index is associated with at least one AI/ML-based CSI report configuration, and wherein each AI/ML-based CSI report configuration is used for configuring one AI/ML CSI, and wherein the one or more AI/ML-based CSI reports configured by one or more AI/ML-based CSI report configurations associated with a same index are associated with a same generator, and wherein the first overheating assistance information comprises an indication of the maximum number of indexes; and generating the one or more AI/ML-based CSI reports based on an index and corresponding AI/ML-based CSI report configuration.

17. The method according to claim 14, further comprising:

measuring a downlink RS resource subset from the downlink RS resource set, wherein the first overheating assistance information is indicative of the downlink RS resource subset, and wherein the downlink RS resource set comprises at least one RS resource other than the downlink RS resource subset.

* * * * *